US008688958B2

(12) United States Patent
Nomoto

(10) Patent No.: US 8,688,958 B2
(45) Date of Patent: Apr. 1, 2014

(54) SYSTEM FOR DATA COLLECTION FROM PROCESSING ELEMENTS IN A SIMD PROCESSOR

(75) Inventor: Shohei Nomoto, Tokyo (JP)

(73) Assignee: NEC Corporation, Tokyo (JP)

( * ) Notice: Subject to any disclaimer, the term of this patent is extended or adjusted under 35 U.S.C. 154(b) by 418 days.

(21) Appl. No.: 13/144,831

(22) PCT Filed: Jan. 14, 2010

(86) PCT No.: PCT/JP2010/050310
§ 371 (c)(1),
(2), (4) Date: Jul. 15, 2011

(87) PCT Pub. No.: WO2010/095476
PCT Pub. Date: Aug. 26, 2010

(65) Prior Publication Data
US 2011/0271077 A1    Nov. 3, 2011

(30) Foreign Application Priority Data
Feb. 18, 2009   (JP) ................................. 2009-035542

(51) Int. Cl.
*G06F 15/80* (2006.01)
(52) U.S. Cl.
USPC ................... 712/22; 712/17; 712/28; 712/30; 712/36
(58) Field of Classification Search
USPC ...................................................... 712/17, 22
See application file for complete search history.

(56) References Cited

U.S. PATENT DOCUMENTS

| 5,416,851 A * | 5/1995 | Huttenlocher et al. ....... 382/196 |
| 2003/0137992 A1* | 7/2003 | Sharper et al. ................ 370/468 |

FOREIGN PATENT DOCUMENTS

| EP | 1014280 A2 * | 6/2000 | ............. G06F 17/30 |
| JP | 5-197694 A | 8/1993 | |
| JP | 6-187312 A | 7/1994 | |
| JP | 8-14816 B | 2/1996 | |
| JP | 2002175238 A | 6/2002 | |
| JP | 2006277635 A | 10/2006 | |
| JP | 2008071037 A | 3/2008 | |

OTHER PUBLICATIONS

International Search Report for PCT/JP2010/050310 mailed Mar. 9, 2010.

* cited by examiner

*Primary Examiner* — Andrew Caldwell
*Assistant Examiner* — Jyoti Mehta
(74) *Attorney, Agent, or Firm* — Sughrue Mion, PLLC

(57) ABSTRACT

A processor has a plurality of PEs (processing elements) that operate in parallel based on operation commands and an information collection unit that collects the data of the plurality of PEs, wherein each of the plurality of PEs holds data and a condition flag, supplies the data and the condition flag to the information collection unit upon receiving an operation command, and upon receiving an update request for updating the condition flag, updates the condition flag in accordance with the update request that was received; and the information collection unit, upon receiving the data and the condition flags, selects one PE based on a predetermined order of priority from among the PEs for which the received condition flags are active and both supplies the data of the selected PE as collection result data and supplies an update request for updating the condition flag of the PE that was selected.

14 Claims, 15 Drawing Sheets

Fig.5

| Condition flag | PE7 | PE6 | PE5 | PE4 | PE3 | PE2 | PE1 | PE0 |
|---|---|---|---|---|---|---|---|---|
| | 1 | 1 | 0 | 1 | 1 | 0 | 1 | 1 |

| | Condition flags | Selection result save unit | Condition flag amendment unit | Condition flag selection unit | Data selection unit |
|---|---|---|---|---|---|
| 0th clock | 11011011 | 00000000 | 11011011 | 10000000 | PE7 |
| First clock | 11011011 | 10000000 | 01011011 | 01000000 | PE6 |
| Second clock | 11011011 | 11000000 | 00011011 | 00010000 | PE4 |
| Third clock | 01011011 | 01010000 | 00001011 | 00001000 | PE3 |
| Fourth clock | 00011011 | 00011000 | 00000011 | 00000010 | PE1 |
| Fifth clock | 00001011 | 00001010 | 00000001 | 00000001 | PE0 |
| Sixth clock | 00000011 | 00000001 | 00000000 | 00000000 | ※ |
| Seventh clock | 00000001 | 00000000 | 00000000 | 00000000 | ※ |
| Eighth clock | 00000000 | 00000000 | 00000000 | 00000000 | ※ |

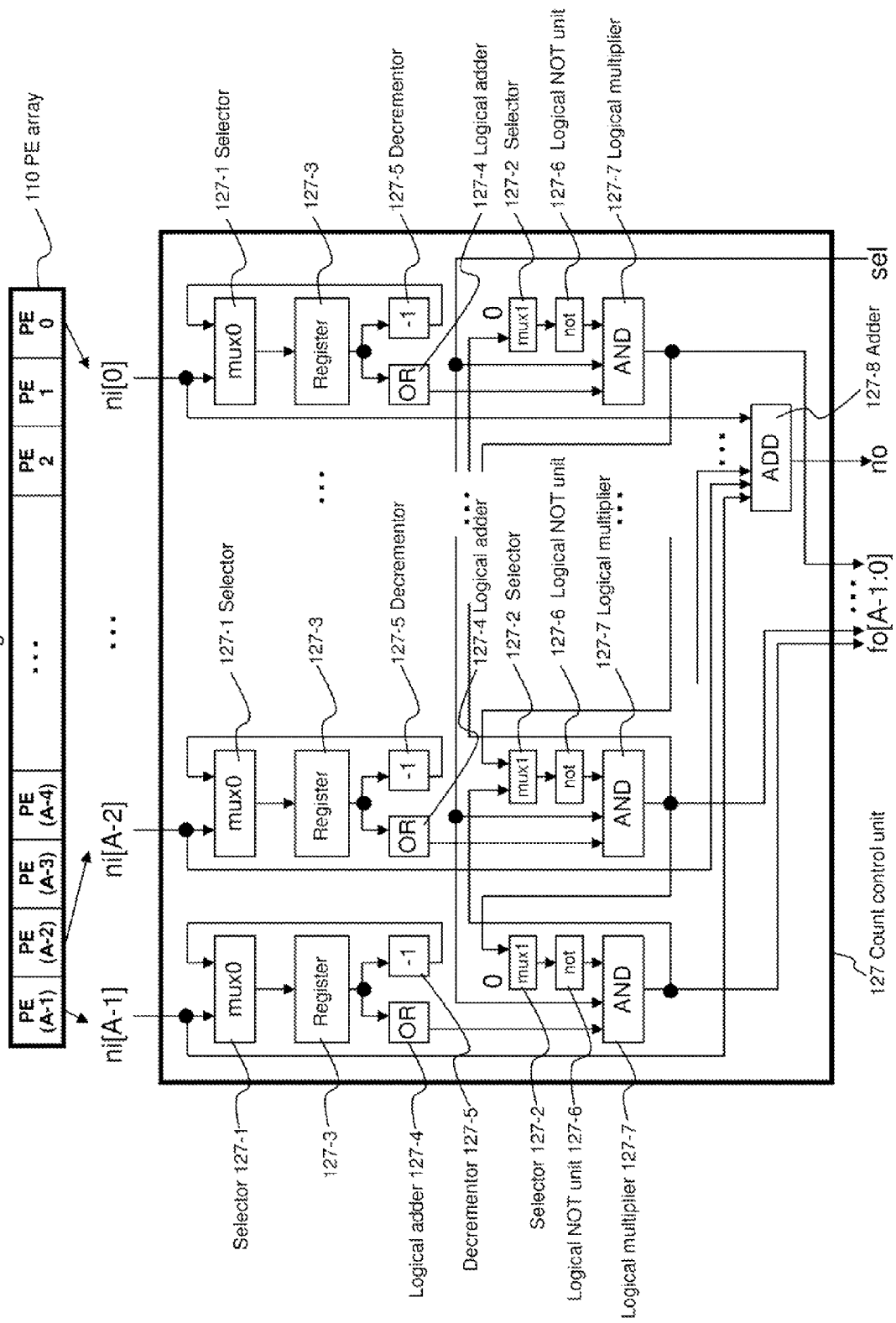

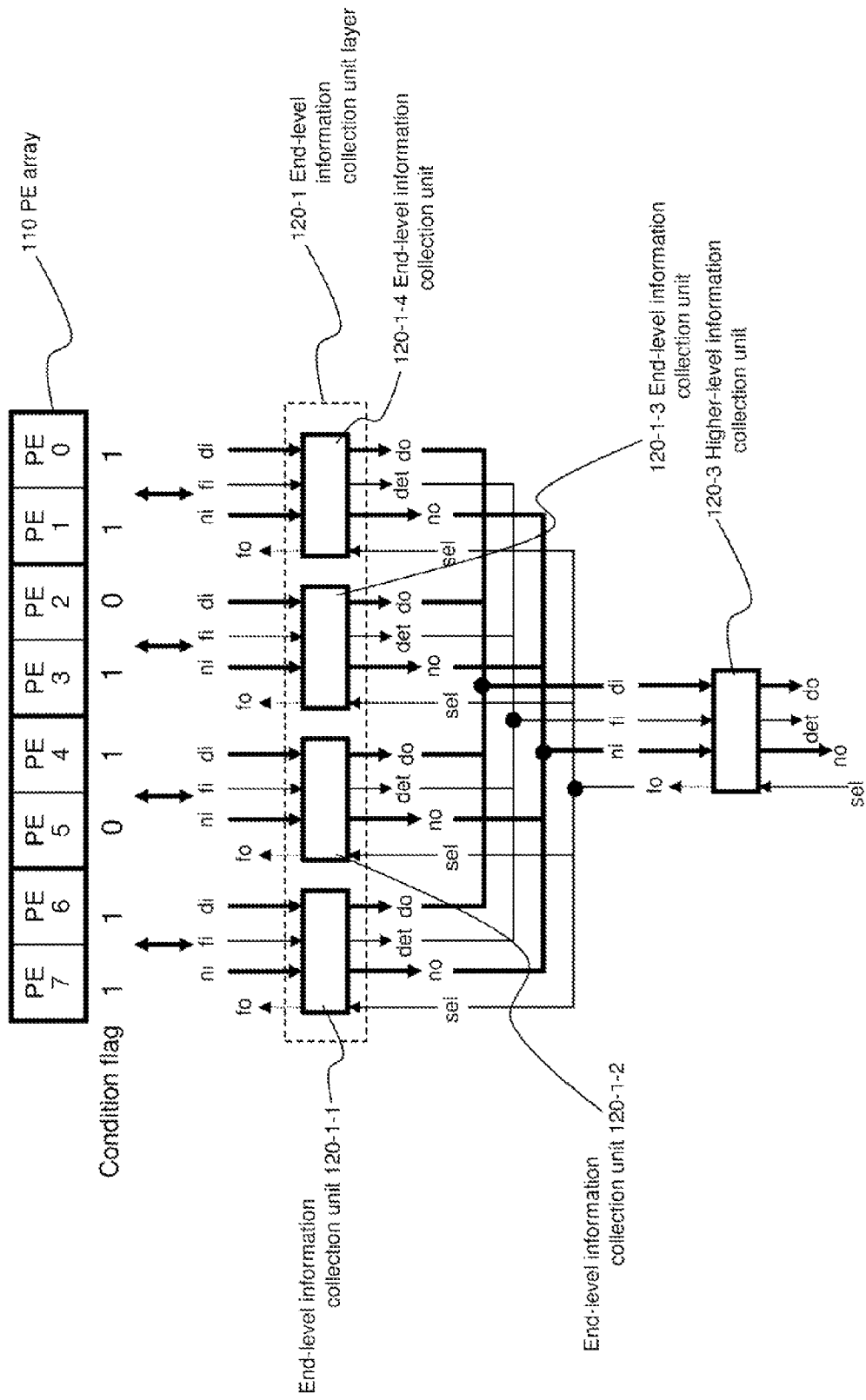

Fig.10

| | Condition flags | End-level information collection units | | Higher-level information collection unit | |
|---|---|---|---|---|---|
| | | Count control unit | Data selection units | Count control unit | Data selection unit |
| Initial Values | 11011011 | 0/0(0,00), 0/0(0,00), 0/0(0,00), 0/0(0,00) | PE7,PE4,PE3,PE1 | 0/0/0/0(0,0000) | PE7 |
| 0th clock | 11011011 | 1/1(2,00), 0/1(1,00), 1/0(1,00), 1/0(1,00) | PE7,PE4,PE3,PE1 | 0/0/0/0(0,0000) | PE7 |
| First clock | 11011011 | 1/1(2,00), 0/1(1,00), 1/0(1,00), 1/1(2,00) | PE7,PE4,PE3,PE1 | 2/1/1/2(6,0000) | PE7 |
| Second clock | 11011011 | 1/1(2,00), 0/1(1,00), 1/0(1,00), 1/1(2,00) | PE7,PE4,PE3,PE1 | 1/1/1/2(6,1000) | PE7 |
| Third clock | 11011011 | 0/1(2,10), 0/1(1,00), 1/0(1,00), 1/1(2,00) | PE7,PE4,PE3,PE1 | 0/1/1/2(6,1000) | PE7 |
| Fourth clock | 01011011 | 0/0(2,01), 0/1(1,00), 1/0(1,00), 1/1(2,00) | PE7,PE4,PE3,PE1 | 0/0/1/2(6,0100) | PE7 |
| Fifth clock | 00011011 | 0/0(1,00), 0/0(1,01), 1/0(1,00), 1/1(2,00) | PE7,PE4,PE3,PE1 | 0/0/0/2(6,0010) | PE7 |
| Sixth clock | 00001011 | 0/0(0,00), 0/0(1,00), 0/0(1,10), 1/1(2,00) | PE6,PE4,PE3,PE1 | 0/0/0/1(5,0001) | PE6 |
| Seventh clock | 00000011 | 0/0(0,00), 0/0(0,00), 0/0(1,00), 0/1(2,10) | PE6,PE4,PE3,PE1 | 0/0/0/0(4,0001) | PE4 |
| Eighth clock | 00000001 | 0/0(0,00), 0/0(0,00), 0/0(0,00), 0/0(2,01) | PE6,PE4,PE3,PE1 | 0/0/0/0(3,0000) | PE3 |
| Ninth clock | 00000000 | 0/0(0,00), 0/0(0,00), 0/0(0,00), 0/0(1,00) | PE6,PE4,PE3,PE0 | 0/0/0/0(2,0000) | PE1 |
| Tenth clock | 00000000 | 0/0(0,00), 0/0(0,00), 0/0(0,00), 0/0(0,00) | PE6,PE4,PE3,PE0 | 0/0/0/0(1,0000) | PE0 |

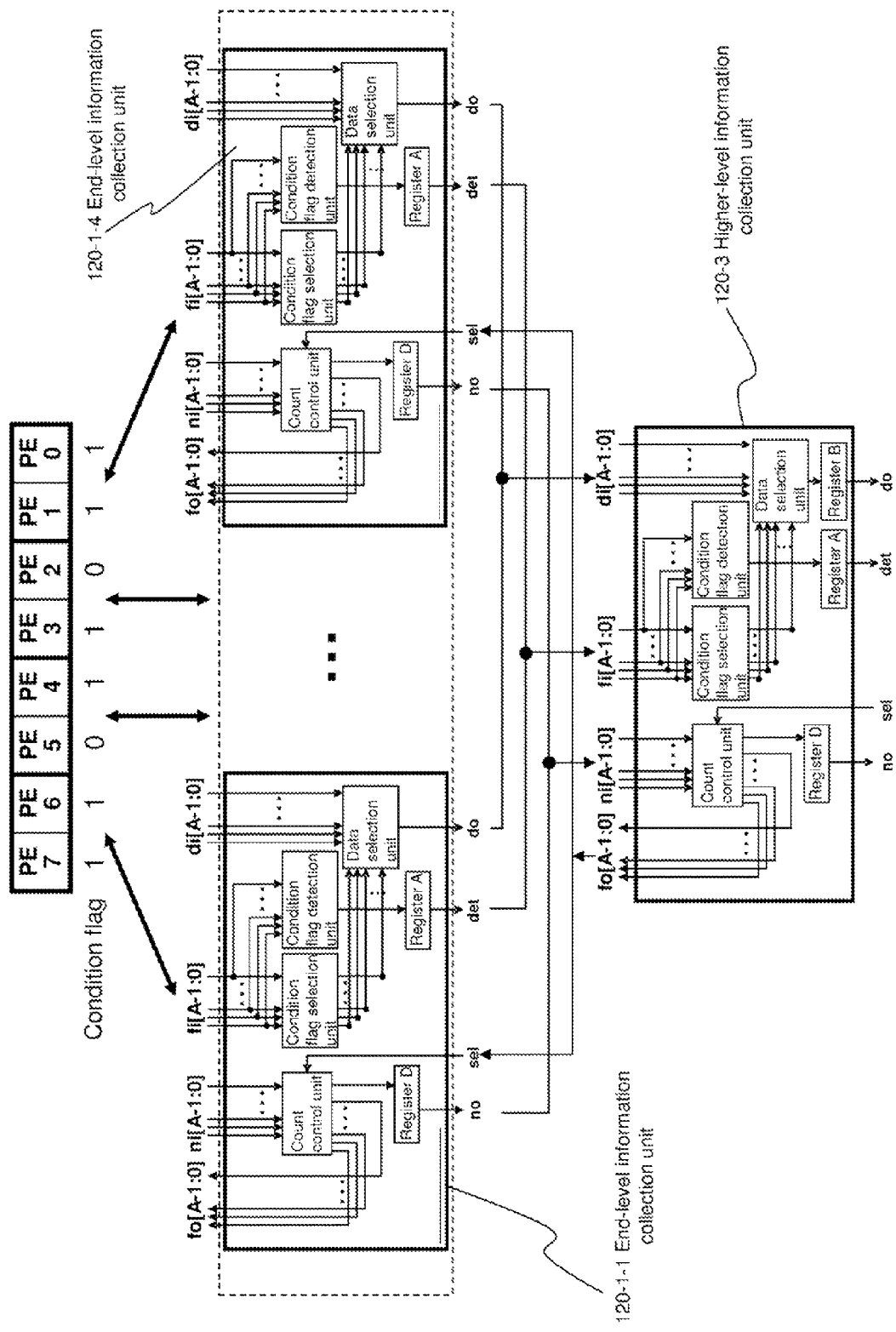

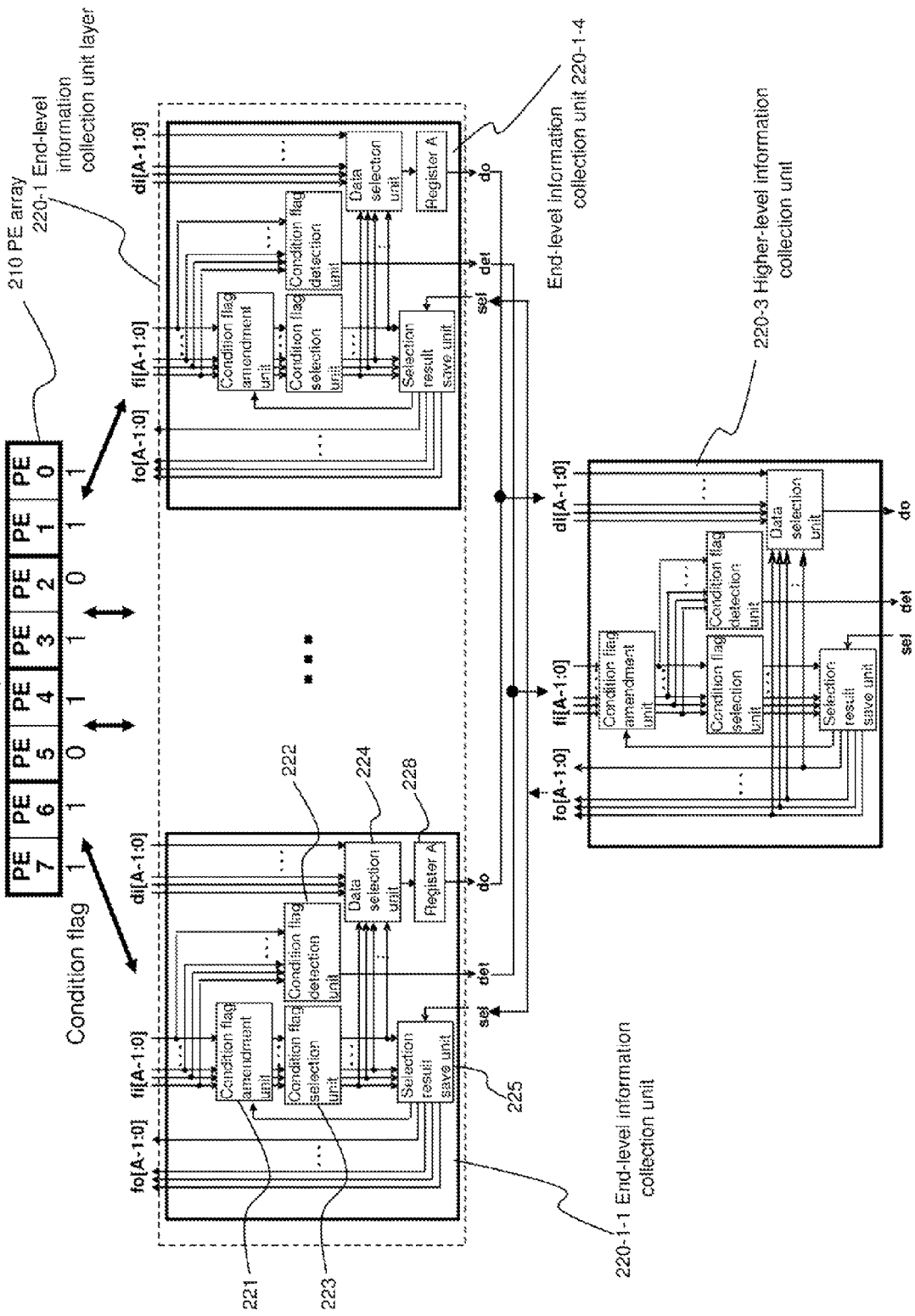

Fig.15

| | End-level information Collection Units | | | Higher-level information Collection Unit | | |
|---|---|---|---|---|---|---|
| | Condition flags (amended) | Condition Flag Selection Units (Selection result save units) | Data Selection Units (register A) | Condition flag Amendment Unit | Condition flag Selection Unit (Selection result save unit) | Data Selection Unit |
| Initial Values | 11011011 (11011011) | 00000000 (00000000) | PE7,PE4,PE3,PE1 (*,*,*,*) | 0000 | 0000 (0000) | * |
| 0th clock | 11011011 (11011011) | 10011010 (00000000) | PE7,PE4,PE3,PE1 (*,*,*,*) | 1111 | 1000 (0000) | * |
| First clock | 11011011 (01011011) | 01011010 (10011010) | PE6,PE4,PE3,PE1 (PE7,PE4,PE3,PE1) | 1111 | 1000 (1000) | PE7 |
| Second clock | 01011011 (00011011) | 00011010 (01011010) | PE6,PE4,PE3,PE1 (PE6,PE4,PE3,PE1) | 0111 | 0100 (1000) | PE6 |
| Third clock | 00011011 (00010011) | 00001010 (00011010) | PE6,PE4,PE3,PE1 (PE6,PE4,PE3,PE1) | 0011 | 0010 (0100) | PE4 |
| Fourth clock | 00010011 (00000011) | 00001010 (00001010) | PE6,PE4,PE3,PE1 (PE6,PE4,PE3,PE1) | 0001 | 0001 (0010) | PE3 |
| Fifth clock | 00000011 (00000001) | 00000001 (00001010) | PE6,PE4,PE3,PE0 (PE6,PE4,PE3,PE1) | 0001 | 0001 (0001) | PE1 |
| Sixth clock | 00000001 (00000000) | 00000000 (00000001) | PE6,PE4,PE3,PE0 (PE6,PE4,PE3,PE0) | 0000 | 0000 (0001) | PE0 |
| Seventh clock | 00000000 (00000000) | 00000000 (00000000) | PE6,PE4,PE3,PE0 (PE6,PE4,PE3,PE0) | 0000 | 0000 (0000) | * |

US 8,688,958 B2

SYSTEM FOR DATA COLLECTION FROM PROCESSING ELEMENTS IN A SIMD PROCESSOR

This application is the National Phase of PCT/JP2010/050310, filed Jan. 14, 2010, which claims the benefits of priority based on Japanese Patent Application No. 2009-035542 for which application was submitted on Feb. 18, 2009 and incorporates by citation all of the disclosures of that application.

TECHNICAL FIELD

The present invention relates to a processor having processing elements that operate in parallel and to a data collection method.

BACKGROUND ART

With the increase in concern for safety and crime prevention in recent years, cameras are being installed in various locations for the purpose of safety and crime prevention. Such functions as automobile accident avoidance and the management of office check-in and check-out are beginning to be realized by subjecting pictures taken by such cameras for safety and crime prevention to picture processing. This picture processing requires a large volume of computation in a short time period. As a result, parallel processors that are capable of processing a multiplicity of data at high speed are being used in the equipment that carries out the picture processing. Parallel processors are processors that can handle a plurality of items of data by a single operation command.

As one such parallel processor, SIMD (Single Instruction Multiple Data) array processors are being developed in which a multiplicity of processing elements operate in parallel and operate based on a single operation command. Processing elements are hereinbelow abbreviated as "PE." In these SIMD-array processors, the parallel operation of a multiplicity of PEs enables the realization of processing that features both high performance and low power consumption.

Algorithms exist for collecting data that satisfy predetermined conditions from PEs that, as a result of carrying out processing, have these data that satisfy the predetermined conditions as processing results. For example, in a pattern-matching process, each PE carries out matching of different pictures in parallel, and only data of PEs that achieved matching are collected. The determination of whether a PE has data that satisfy the predetermined condition is realized by condition flags of the PEs. The condition flags are, for example, flags represented by one bit and, depending on the data belonging to the PEs, indicate "1" when the data satisfy the predetermined condition and indicate "0" when the data do not satisfy the predetermined conditions. In the following explanation, the setting of the bit to "1" will be referred to as "active," and a setting of the bit to "0" will be referred to as "inactive."

In an SIMD-array processor, data and condition flags are collected from all PEs, and determination of whether to use the collected data as collection result data is realized by sequentially judging the collected condition flags.

However, in a method of this type, data that do not satisfy the predetermined condition must also be collected and condition flags must be sequentially judged for each PE. As a result, the number of clock cycles for collecting data that satisfy the predetermined condition becomes voluminous.

In response, Patent Document 1 discloses an SIMD-array processor that collects only data that satisfy a predetermined condition in order from PEs for which a PE number that is given to each PE is large or from PEs for which the PE number is small.

FIG. 1 shows an example of the configuration of an SIMD-array processor that collects only data that satisfy a predetermined condition in order from PEs for which the PE number is small or from PEs for which the PE number is large.

The SIMD-array processor shown in FIG. 1 is equipped with PEs 300-1-300-n and central processor 400.

Each of PEs 300-1-300-n is equipped with general register 301 that processes commands supplied from central processor 400, ALU (Arithmetic and Logic Unit) group 302, F-register 303 that stores condition flags, and comparator 304. The ALU is a circuit that carries out arithmetic processing such as the four basic operations of arithmetic or logical operations.

Comparator 304 compares the PE number supplied from register 404 of central processor 400 and its own PE number.

Central processor 400 supplies commands to PEs 300-1-300-n and controls the overall SIMD-array processor. Central processor 400 is equipped with general register 401 that processes commands, ALU group 402, priority encoder 403, and registers 404 and 405.

Priority encoder 403 checks the condition flags of PEs 300-1-300-n based on the predetermined order of priority, selects PE numbers one at a time that indicate PEs for which the condition flags are active, and stores the selected PE numbers in register 404.

Register 404 stores the PE numbers that are selected by priority encoder 403, and then supplies the stored PE numbers to PEs 300-1-300-n.

Register 405 stores the data that are supplied from PEs 300-1-300-n.

In the SIMD-array processor that is disclosed in the above-described Patent Document 1, data that satisfy a predetermined condition are collected by the procedures shown in (1)-(7) below.

(1) Condition flags that are stored in F-registers 303 of PEs 300-1-300-n are applied as input to priority encoder 403 of central processor 400.

(2) Priority encoder 403 selects one condition flag that is active from the condition flags of PEs 300-1-300-n based on a predetermined order of priority.

(3) The PE number of PEs 300-1-300-n that corresponds to the selected condition flag is stored in register 404.

(4) Using PE designation path 350, the PE number that was stored in (3) above is broadcast to all PEs 300-1-300-n.

(5) In each of PEs 300-1-300-n, the PE number that was broadcast is compared with the PE number of that PE 300-1-300-n.

(6) The condition flag of only that PE in which the PE number that was broadcast matched its own PE number is updated to be inactive. This PE then supplies the data of general register 301 to register 405 by way of data collection path 450.

(7) The data that were supplied from the PE by way of data collection path 450 are stored in register 405.

LITERATURE OF THE PRIOR ART

Patent Documents

Patent Document 1: JP-A-2008-071037

SUMMARY OF THE INVENTION

Problem to be Solved by the Invention

The use of the SIMD-array processor that was disclosed in the above-described Patent Document 1 enables the collection of only data that satisfy a predetermined condition.

As shown in (3) described above, in the method disclosed in Patent Document 1, a PE number that is the result of the midpoint of processing is temporarily stored in register 404. As a result, at least two clock cycles are required to execute the processing of the above-described (1)-(7). Still further, a delay of at least one clock cycle is normally produced for updating the condition flag.

The problem therefore arises that the collection of data that satisfy a predetermined condition cannot be carried out continuously.

In addition, the path from the supply of PE numbers from register 404 of central processor 400, through the comparison of PE numbers in PEs 300-1-300-n, and up to the storage of the data in register 405 is extremely long. As a result, the problem arises that this path becomes the critical path and the operating speed of the overall processor is limited by this critical path. The critical path is the path having the greatest signal transmission delay. The performance of the processor is limited by the time for executing commands that follow the critical path.

It is an object of the present invention to provide a processor and a data collection method that enable efficient collection of data that satisfy a predetermined condition without the operating speed being limited by a critical path.

Means for Solving the Problem

The present invention for achieving the above-described object is a processor that includes a plurality of processing elements that operate in parallel based on operation commands and an information collection unit that collects data of each of the plurality of processing elements, wherein:

each of the plurality of processing elements holds data and a condition flag that is set to be active or inactive depending on the data, upon receiving the operation command, supplies the data and the condition flag to the information collection unit, and then, upon receiving an update request to update the condition flag to be inactive, updates the condition flag to be inactive in accordance with the update request that was received; and the information collection unit, upon receiving the data and the condition flags that are supplied from each of the plurality of processing elements, selects one processing element based on a predetermined order of priority from among the processing elements for which the condition flags that were received are active, and both supplies the data of the selected processing element as collection result data and supplies the update request for updating the condition flag of the selected processing element to be inactive.

In addition, the present invention is a data collection method in a processor that includes a plurality of processing elements that hold data and condition flags that are set to be active or inactive according to the data and that operate in parallel based on operation commands and an information collection unit that collects data of each of the plurality of processing elements, the data collection method including:

a process of each of the plurality of processing elements, upon receiving the operation command, supplying the data and the condition flag to the information collection unit;

a process of the information collection unit receiving the data and the condition flags that were supplied from each of the plurality of processing elements;

a selection process of the information collection unit selecting one processing element based on a predetermined order of priority from among processing elements for which the condition flags that were received are active;

a process of the information collection unit supplying the data of the processing element that was selected as collection result data;

an update request output process of the information collection unit supplying an update request for updating the condition flag of the processing element that was selected to be inactive; and a process of each of the processing elements, upon receiving the update request, updating the condition flag to be inactive in accordance with the update request that was received.

Effect of the Invention

According to the present invention, each of a plurality of processing elements supplies data and a condition flag to an information collection unit, and then, upon subsequently receiving an update request for updating the condition flag to be inactive, updates the condition flag to be inactive in accordance with the update request that was received. The information collection unit, upon receiving data and condition flags that are supplied from each of the plurality of processing elements, based on a predetermined order of priority, selects one processing element from among the processing elements for which the condition flags that were received are active, and then both supplies the data of the processing element that was selected as collection result data and supplies an update request for updating the condition flag of the processing element that was selected to be inactive.

As a result, data that satisfy a predetermined condition can be collected efficiently without the operating speed being limited by the critical path.

BRIEF DESCRIPTION OF THE DRAWINGS

FIG. 5 is a view for describing the operation of collecting data in the SIMD-array processor shown in FIGS. 2 to 4;

FIG. 8 is a block diagram showing an example of the configuration of the count control unit shown in FIG. 7;

FIG. 9 is a block diagram showing an example of the configuration of the SIMD-array processor shown in FIG. 6;

FIG. 10 is a view for describing the operation of collecting data in the SIMD-array processor shown in FIGS. 6 to 9;

FIG. 11 is a block diagram showing an example of the configuration when register B and register C are eliminated from the end-level information collection unit and register C is eliminated from the higher-level information collection unit in the SIMD-array processor shown in FIGS. 6 to 9;

FIG. 14 is a block diagram showing an example of the configuration of the SIMD-array processor shown in FIG. 12; and FIG. 15 is a view for describing the operation of collecting data in the SIMD-array processor shown in FIGS. 12 to 14.

BEST MODE FOR CARRYING OUT THE INVENTION

Exemplary embodiments of the present invention are described hereinbelow with reference to the accompanying drawings.

First Exemplary Embodiment

Figure 1:
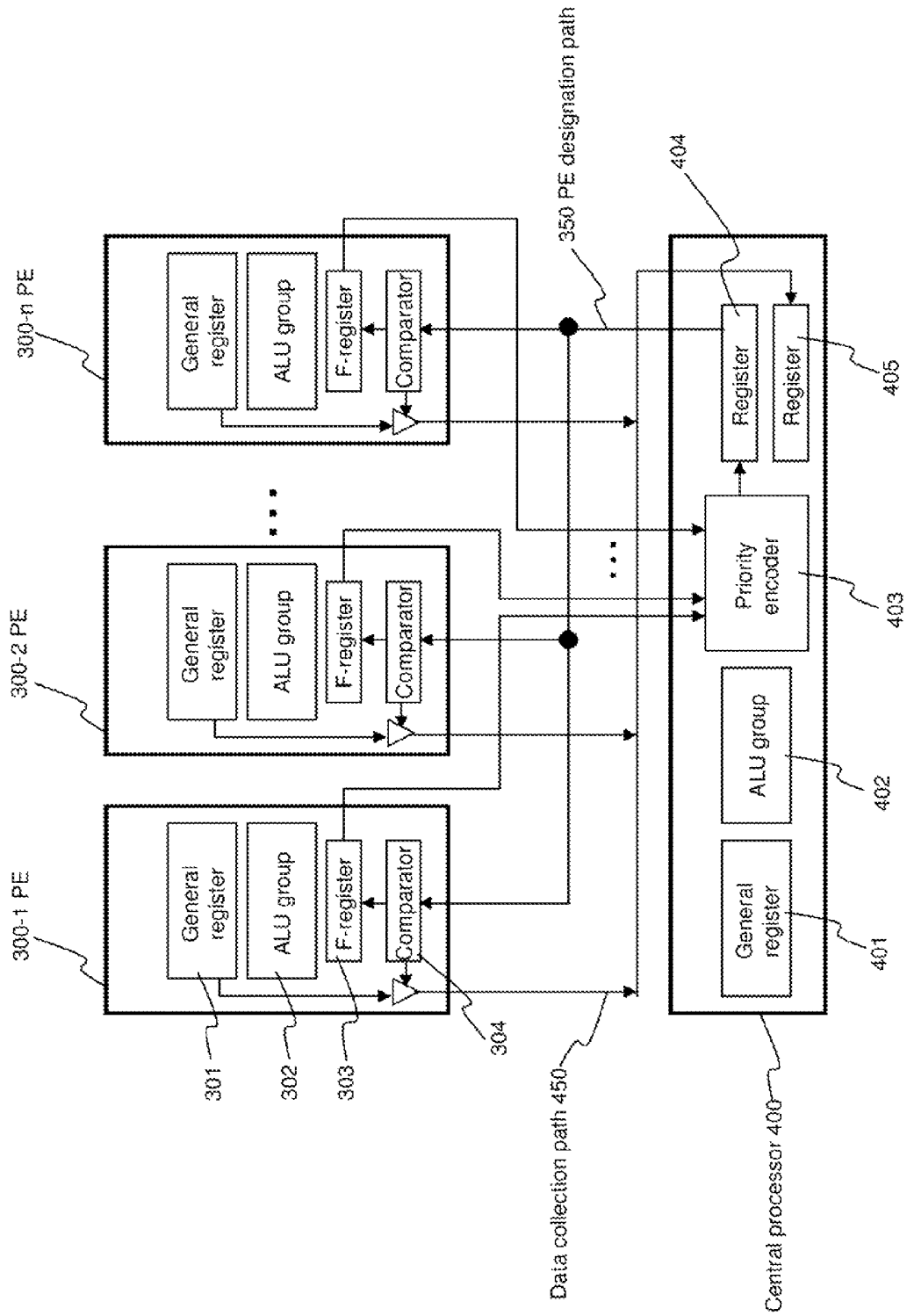
FIG. 1 shows an example of the configuration of an SIMD-array processor that collects only data that satisfy a predetermined condition in order from PEs for which the PE number is small or from PEs for which the PE number is large.
Figure 2:
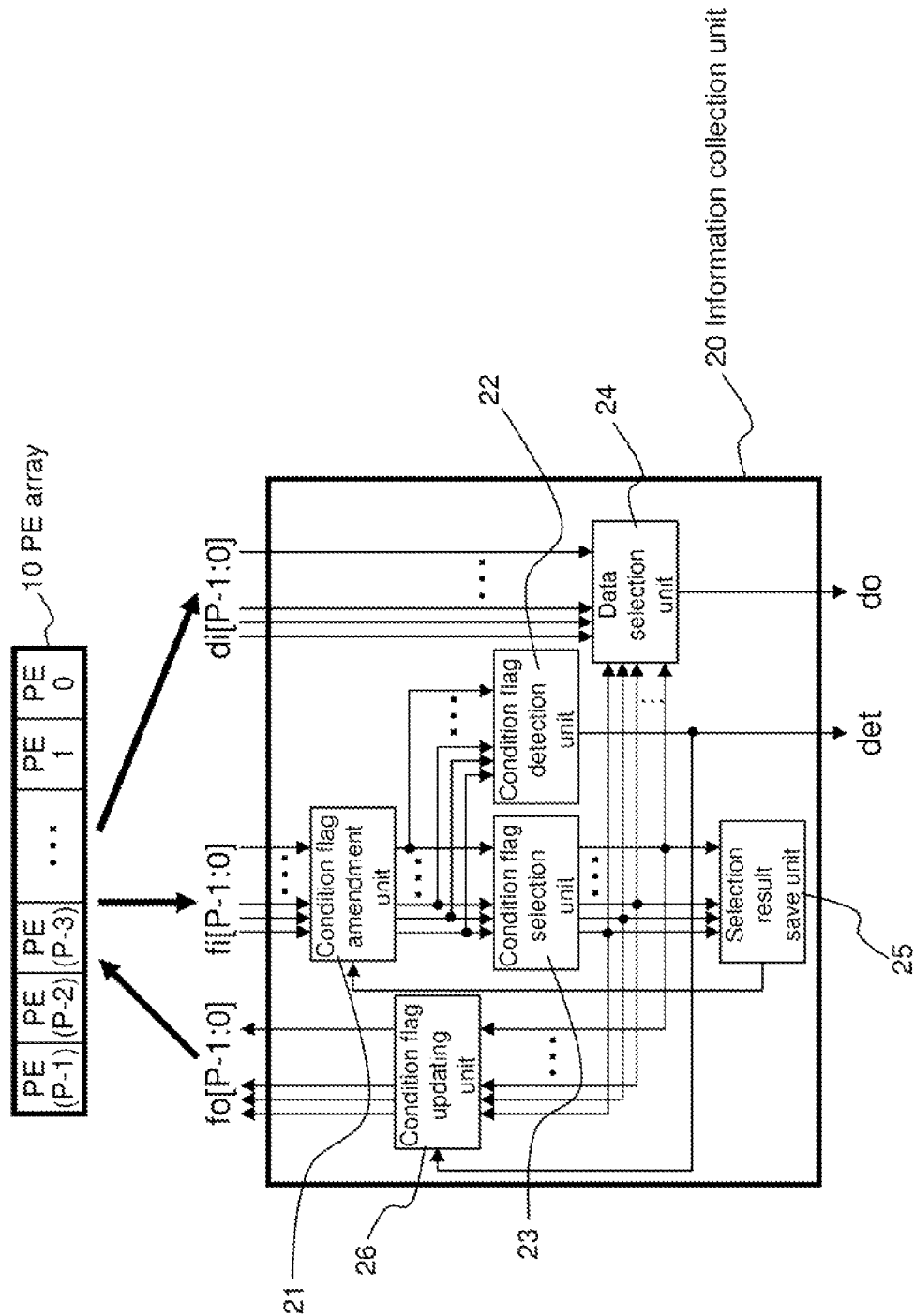
FIG. 2 is a block diagram showing the configuration of the first exemplary embodiment of an SIMD-array processor in which the processor of the present invention is applied.

FIG. 2 is a block diagram showing the configuration of the first exemplary embodiment of the SIMD-array processor in which the processor of the present invention is applied.

As shown in FIG. 2, the SIMD-array processor of the present exemplary embodiment is provided with PE array 10 that is made up from P PEs, and information collection unit 20 that collects data from PEs that have data that satisfy a predetermined condition among each of the PEs of PE array 10. P is a natural number equal to or greater than 2. Although each constituent element is hereinbelow referred to as a "unit" as in "information collection unit," these "units" are made up from blocks that are composed of a circuit or a plurality of circuits.

PE array 10 supplies the condition flag of each PE and the data of each PE to information collection unit 20. In FIG. 2, each of the condition flags and data that are supplied from PE array 10 are represented as fi and di, respectively.

Information collection unit 20 receives the condition flag of each PE (fi) and the data of each PE (di) that are supplied from PE array 10. Because PE array 10 is made up from P PEs, the condition flags that are received have a length of P bits. In addition, information collection unit 20 supplies to each PE of PE array 10 an update request for updating the condition flag of each PE to be inactive. In FIG. 2, the update request supplied from information collection unit 20 is represented as fo. In addition, information collection unit 20 supplies as output detection results that indicate that the condition flag of at least one PE is active, and selected data that are the data of the PEs that were selected among the PEs. The PEs that are selected are PEs that satisfy a predetermined condition. In FIG. 2, moreover, the detection results and selected data that are supplied as output from information collection unit 20 are represented as det and do, respectively. Information collection unit 20 is further provided with condition flag amendment unit 21 that is the first condition flag amendment unit, condition flag detection unit 22, condition flag selection unit 23 that is the first condition flag selection unit, data selection unit 24 that is the first data selection unit, selection result save unit 25 that is the first selection result save unit, and condition flag updating unit 26.

Condition flag detection unit 22 receives amended condition flags that are supplied as output from condition flag amendment unit 21 and detects that at least one bit among the amended condition flags that were received is active. Condition flag detection unit 22 then supplies a detection result (det) according to the detected result. Condition flag detection unit 22 needs only detect that at least one of the amended condition flags is active and is therefore made up from a logical adder of P bits. The detection result is active if at least one of the amended condition flags that were received is active but is inactive if all of the amended condition flags that were received are inactive. In addition, the amended condition flags are condition flags that have been amended by condition flag amendment unit 21, and have a length of P bits similar to the condition flags. Details of the amended condition flags will be described later.

Condition flag selection unit 23 receives the amended condition flags that were supplied as output from condition flag amendment unit 21. Condition flag selection unit 23 then selects one bit that is active based on a predetermined order of priority from among the amended condition flags that were received. Condition flag selection unit 23 then supplies a selection result that indicates the bit that was selected to data selection unit 24, selection result save unit 25, and condition flag updating unit 26. The predetermined order of priority is an operation command that the SIMD-array processor shown in FIG. 2 receives and is determined by SIMD-data collection command for collecting data that satisfy a predetermined condition.

Figure 3:
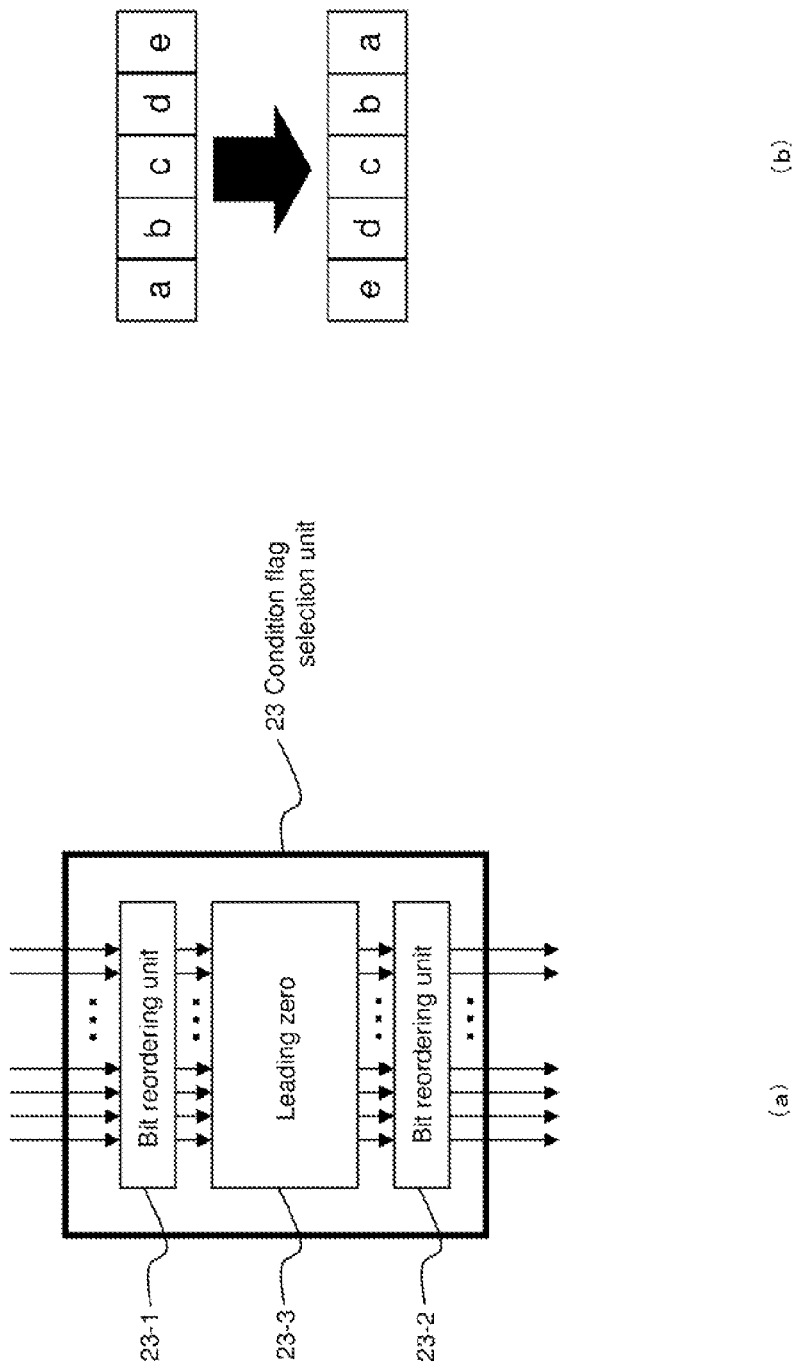
FIG. 3 is a view for describing the operation of the condition flag selection unit shown in FIG. 3, (a) being a block diagram showing an example of the configuration of the condition flag selection unit, and (b) being a view for describing the conversion of a bit string that is performed by the condition flag selection unit.

FIG. 3 is a view for describing the operation of condition flag selection unit 23 shown in FIG. 2, (a) being a block diagram showing an example of the configuration of condition flag selection unit 23 and (b) being a view for describing the conversion of a bit string that is performed by condition flag selection unit 23.

Condition flag selection unit 23 that is shown in FIG. 2 is provided with bit reordering units 23-1 and 23-2 and leading zero 23-3, as shown in FIG. 3(a). The leading zero is a circuit that counts the number of "0" that appear continuously from the MSB (Most Significant Bit) or LSB (Least Significant Bit) of a bit string. MSB is the most significant bit of a bit string, and LSB is the least significant bit of a bit string.

Bit reordering units 23-1 and 23-2 reorder the MSB side and LSB side of amended condition flags that are received and supply the result as output. More specifically, when a bit string that is received is, for example, "abcde," bit reordering units 23-1 and 23-2 reorder the bit string to "edcba" as shown in FIG. 3(b).

Leading zero 23-3 receives the bit string that was supplied from bit reordering unit 23-1 and searches the received bit string from the MSB side or the LSB side to detect the "1" that appears first. Leading zero 23-3 then converts the received bit string to a bit string in which only the bit of the position of "1" that was detected is "1" and supplies the result as output.

The conversion of the bit string that was applied as input by bit reordering units 23-1 and 23-2 is for cases in which the direction of searching for the "1" that appears first in the bit string that is received by leading zero 23-3 does not coincide with the direction of collecting data that is determined by an SIMD data collection command.

Referring again to FIG. 2, data selection unit 24 receives the data of each PE that is supplied from PE array 10 and the selection results that are supplied as output from condition flag selection unit 23. The logical product of the data of each PE that was received and the selection results is then calculated by a logical multiplier (not shown). Then, by computing the calculated result by means of a logical adder (not shown), one item of data is selected from among the data of each PE that was received. The selected item of data is then supplied as selected data (do). These selected data are the collection result data that is the output in response to the SIMD data collection command. A selector may be provided for selecting data in place of the logical multiplier and logical adder described above.

Based on the selection result supplied from condition flag selection unit 23 and the detection results that are supplied from condition flag detection unit 22, condition flag updating unit 26 supplies an update request (fo) to PE array 10 for causing the condition flags of each PE of PE array 10 to be updated. More specifically, when the detection result supplied from condition flag detection unit 22 is active, the selection result of condition flag selection unit 23 is supplied to PE array 10 as an update request (fo). The update request is of a length of P bits that corresponds to the number of PEs of PE array 10. Each PE of PE array 10 that receives the update request (fo) supplied from condition flag updating unit 26 updates its own condition flag to be inactive if the bit of the received update request (fo) that corresponds to that PE is active. If the bit of the received update request (fo) that corresponds to that PE is inactive, the PE does not update its own condition flag. On the other hand, when the detection result that is supplied from condition flag detection unit 22 is inactive, condition flag updating unit 26 supplies an update request that makes all bits inactive to PE array 10.

Figure 4:
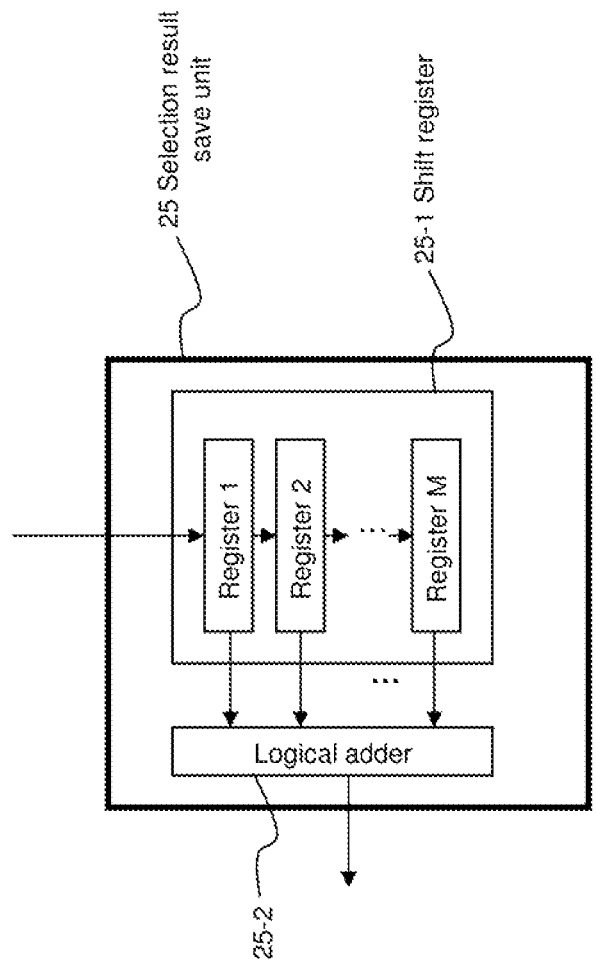
FIG. 4 is a block diagram showing an example of the configuration of the selection result save unit shown in FIG. 2.

FIG. 4 is a block diagram showing an example of the configuration of selection result save unit 25 that is shown in FIG. 2.

As shown in FIG. 4, selection result save unit 25 shown in FIG. 2 is equipped with shift register 25-1 that is made up from M registers and logical adder 25-2 that computes the logical sum of the M registers in bit units. M is an integer equal to or greater than 1.

Selection result save unit 25 receives the selection result that was supplied from condition flag selection unit 23 and stores the selection result that was received. When the number of delay clock cycles, which is the number of clock cycles necessary for updating the condition flags of each PE, is M clock cycles, selection result save unit 25 stores the selection result of condition flag selection unit 23 in M shift registers 25-1. The logical sum of M registers is then calculated in bit units by logical adder 25-2 and condition flag amendment information, which is the calculated result, is supplied to condition flag amendment unit 21.

Referring again to FIG. 2, condition flag amendment unit 21 calculates in bit units the exclusive OR of the condition flag (fi) of each PE that is supplied from PE array 10 and the condition flag amendment information that is supplied from selection result save unit 25. The amended condition flag, which is the calculation result, is then supplied to condition flag detection unit 22 and condition flag selection unit 23. The amendment of the condition flags is a case in which delay clock cycles occur and SIMD data collection commands are continuously issued in these delay clock cycles.

The operation of collecting data in the SIMD-array processor that is configured as described above is next described.

FIG. 5 is a view for describing the operation of collecting data in the SIMD-array processor shown in FIGS. 2 to 4. Here, PE array 10 has eight PEs (PE 7 to PE 0), and the condition flags of each of these eight PEs are assumed to be "11011011" in the order of PE7-PE0. In addition, the number of delay clock cycles until the condition flags of the PEs are updated is assumed to be two clock cycles. It is further assumed that higher priority is given to PEs on the left side of the figure.

The $0^{th}$ clock is the first cycle of executing an SIMD array information collection command. As a result, nothing is stored in selection result save unit 25. Accordingly, condition flag amendment unit 21 that has received condition flags (fi) of each PE that are supplied from PE array 10 supplies the condition flags (fi) that were received to condition flag detection unit 22 and condition flag selection unit 23 as amended condition flags.

Condition flag selection unit 23 that has received the amended condition flags "11011011" that are supplied from condition flag amendment unit 21 selects "1" that is on the extreme left side among the bits that are active in the amended condition flags that were received, and then supplies the selection result to data selection unit 24, selection result save unit 25, and condition flag updating unit 26. In this case, "10000000" is supplied as the selection result as shown in the column of the condition flag selection unit and the row of the $0^{th}$ clock in FIG. 5.

Data selection unit 24, having received the selection result that is supplied from condition flag selection unit 23 and data (di) of each PE that are supplied from PE array 10, selects data of PEs according to the selection result that was received and supplies the selected data as selected data (do). In this case, data of "PE7" are supplied as selected data (do) as shown in the column of the data selection unit and the row of the $0^{th}$ clock in FIG. 5.

Selection result save unit 25, having received the selection result that was supplied from condition flag selection unit 23, stores the selection result "10000000" that was received in shift register 25-1 at the ending clock edge of the $0^{th}$ clock.

Next, in the first clock, selection result save unit 25 supplies the "10000000" that is stored to condition flag amendment unit 21 as condition flag amendment information.

Condition flag amendment unit 21, having received the condition flag amendment information that was supplied from selection result save unit 25, finds the exclusive OR of the condition flag amendment information "10000000" that was received and the condition flags (fi) "11011011" that were supplied from PE array 10. In other words, the bit of the condition flag that corresponds to the selection result of the $0^{th}$ clock is amended to "0" and the amended condition flags become "01011011." Condition flag amendment unit 21 supplies these amended condition flags to condition flag detection unit 22 and condition flag selection unit 23.

Condition flag selection unit 23, having received the amended condition flags "01011011" that were supplied from condition flag amendment unit 21, selects "1" that is on the extreme left from among the bits that are active in the amended condition flags that were received, and then supplies this selection result to data selection unit 24, selection result save unit 25, and condition flag updating unit 26. In this case, "01000000" is supplied as the selection result as shown by the column of the condition flag selection unit and the row of the first clock in FIG. 5.

Data selection unit 24, having received the selection result that was supplied from condition flag selection unit 23 and the data (di) of each PE that were supplied from PE array 10, selects data of the PE according to the selection result that was received and supplies the data that were selected as selected data (do). In this case, the data of "PE6" are supplied as selected data (do) as shown by the column of the data selection unit and the row of the first clock in FIG. 5.

Selection result save unit 25 that has received the selection result that was supplied from condition flag selection unit 23 stores "01000000" that is the selection result that was received in shift register 25-1 at the ending clock edge of the first clock.

Next, in the second clock, selection result save unit 25 stores "10000000" that is the selection result of the $0^{th}$ clock and "01000000" that is the selection result of the first clock. As a result, selection result save unit 25 calculates the logical sum of the selection result of the $0^{th}$ clock and the selection result of the first clock by means of logical adder 25-2, and then supplies "11000000" that is the calculation result as condition flag amendment information to condition flag amendment unit 21.

Condition flag amendment unit 21, having received the condition flag amendment information that was supplied from selection result save unit 25, calculates the exclusive OR of the received condition flag amendment information "11000000" and the condition flags (fi) "11011011" that were supplied from PE array 10. In other words, the bits of the condition flags that correspond to the selection results of the $0^{th}$ clock and the first clock are amended to "0" and the amended condition flags thus become "00011011." Condition flag amendment unit 21 then supplies the amended condition flags to condition flag detection unit 22 and condition flag selection unit 23.

Condition flag selection unit 23 that has received the amended condition flags "00011011" that were supplied from condition flag amendment unit 21 selects the "1" on the extreme left side among the bits that are active in the amended condition flags that were received, and then supplies the selection result to data selection unit 24, selection result save unit 25, and condition flag updating unit 26. In this case, "00010000" is supplied as the selection result as shown by the column of condition flag selection unit 23 and the row of the second clock in FIG. 5.

Data selection unit 24 that has received the selection result that was supplied from condition flag selection unit 23 and the data of each PE that are supplied from PE array 10 selects the data of the PE that corresponds to the selection result that was received and supplies the data that were selected as selected data. In this case, the data of "PE4" are supplied as selected data as shown by the column of the data selection unit and the row of the second clock in FIG. 5.

Selection result save unit 25, having received the selection result that was supplied from condition flag selection unit 23, stores the selection result "00010000" that was received in shift register 25-1 at the ending clock edge of the second clock. Selection result save unit 25 additionally discards from shift register 25-1 the selection result that was stored in the $0^{th}$ clock.

Here, condition flag updating unit 26 that has received the selection result that was supplied from condition flag selection unit 23 and the detection result that was supplied from condition flag detection unit 22 in the $0^{th}$ clock supplies update request (fo) for updating the condition flag of PE7 to PE array 10.

In PE array 10 that has received the update request (fo) that was supplied from condition flag updating unit 26, the condition flag of PE7 is updated to "0" that indicates inactive. This updated condition flag is shown in the column of condition flag and the row of the third clock in FIG. 5.

In the third clock, selection result save unit 25 next stores the selection result "01000000" of the first clock and the selection result "00010000" of the second clock. As a result, selection result save unit 25 calculates the logical sum of the selection result of the first clock and the selection result of the second clock by means of logical adder 25-2, and then supplies the calculation result "01010000" as condition flag amendment information to condition flag amendment unit 21.

Condition flag amendment unit 21 that has received the condition flag amendment information that was supplied from selection result save unit 25 calculates the exclusive OR of the condition flag amendment information "01010000" that was received and the condition flags (fi) "01011011" that were supplied from PE array 10. In other words, the bits of the condition flags that correspond to the selection results of the first clock and the second clock are amended to "0" and the amended condition flags become "00001011." Condition flag amendment unit 21 supplies these amended condition flags to condition flag detection unit 22 and condition flag selection unit 23.

Condition flag selection unit 23 that has received the amended condition flags "00001011" that were supplied from condition flag amendment unit 21 selects the "1" that is on the extreme left side of the bits that are active in the amended condition flags that were received. Condition flag selection unit 23 then supplies the selection result to data selection unit 24, selection result save unit 25 and condition flag updating unit 26. In this case, "00001000" is supplied as the selection result as shown in the column of condition flag selection unit 23 and the row of the third clock in FIG. 5.

Data selection unit 24 that has received the selection result that was supplied from condition flag selection unit 23 and the data (di) of each PE that are supplied from PE array 10 selects the data of the PE that corresponds to the selection result that was received and supplies the data that were selected as selected data (do). In this case, the data of "PE3" are supplied as selected data (do) as shown in the column of the data selection unit and the row of the third clock in FIG. 5.

Selection result save unit 25 that has received the selection result that was supplied from condition flag selection unit 23 stores the selection result "00001000" that was received in shift register 25-1 at the ending clock edge of the third clock. Selection result save unit 25 additionally discards the selection result that was stored in the first clock from shift register 25-1.

In the fourth to eighth clocks, the same processing as described hereinabove is carried out.

Thus, in the present exemplary embodiment, each of the PEs of PE array 10 supplies data (di) and a condition flag (fi) to information collection unit 20 and, upon receiving an update request (fo) for updating the condition flag to be inactive, updates the condition flag to be inactive in accordance with the update request (fo) that was received. In addition, information collection unit 20, upon receiving data (di) and condition flags (fi) that are supplied from each of the PEs of PE array 10, selects one PE based on a predetermined order of priority from among the PEs for which the received condition flags are active and then both supplies the data that are supplied as output from the selected PE as collection result data and supplies an update request (fo) for updating the condition flag of the selected processing element to be inactive.

As a result, the operating speed is not limited by a critical path.

In addition, the SIMD data collection command can be continuously issued and data that satisfy a predetermined condition can be efficiently collected even when delay of M clock cycles occurs in the updating of condition flags.

Second Exemplary Embodiment

Figure 6:
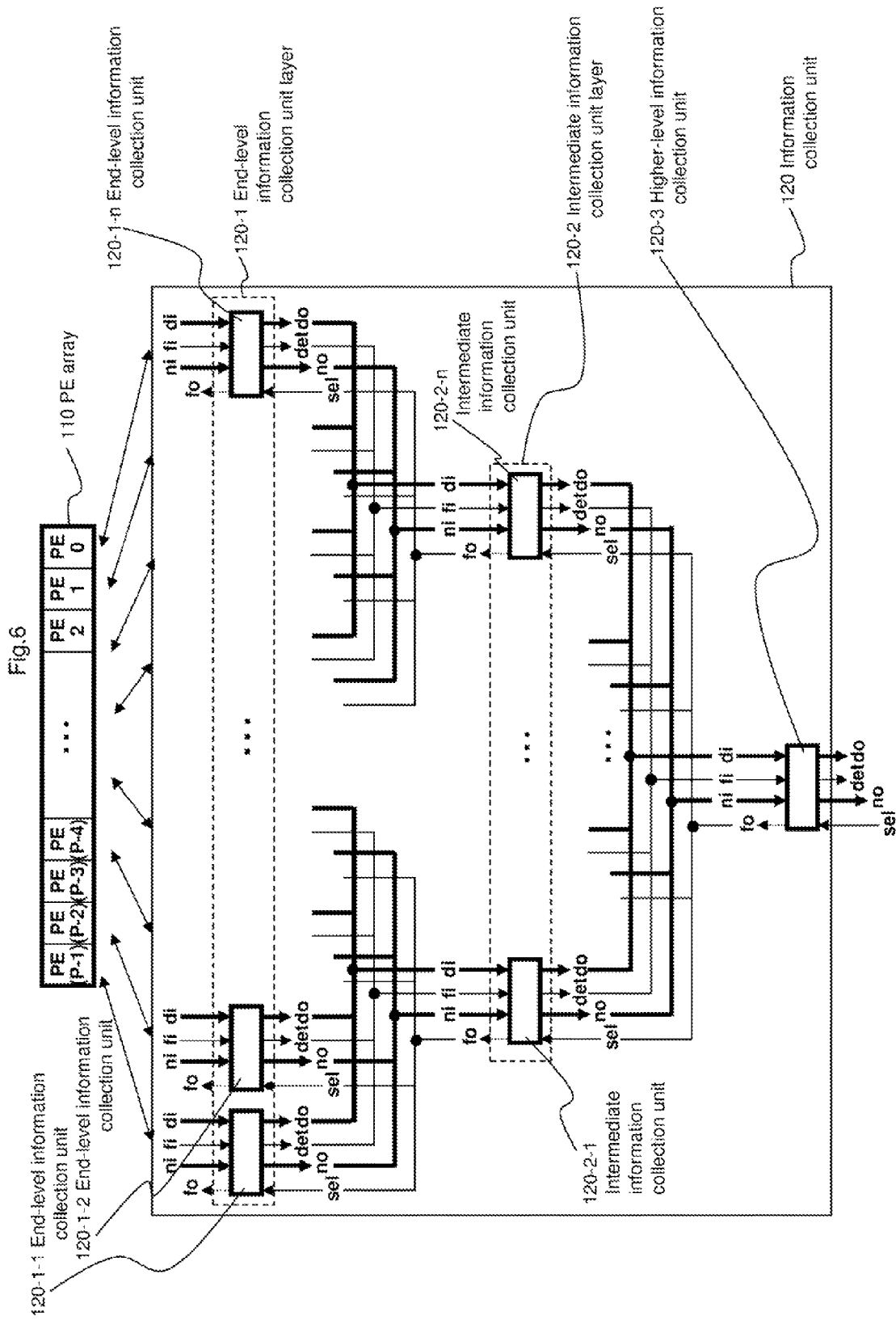
FIG. 6 is a block diagram showing the configuration of the second exemplary embodiment of the SIMD-array processor in which the processor of the present invention is applied.

FIG. 6 is a block diagram showing the configuration of the second exemplary embodiment of the SIMD-array processor in which the processor of the present invention is applied.

As shown in FIG. 6, the SIMD-array processor of the present exemplary embodiment is provided with PE array 110 that is made up from P PEs, and information collection unit 120 that collects data from PEs that have data that satisfy a predetermined condition among the PEs of PE array 110. P is a natural number equal to or greater than 2.

PE array 110 supplies the condition flags (fi) of each PE, the data (di) of each PE, and an active number to information collection unit 120. The active number is information indicating the PEs for which the condition flags are active. In FIG. 6, the active number that is supplied from PE array 110 is represented as "ni."

Information collection unit 120 receives the condition flag (fi) of each PE, the data (di) of each PE, and the active number (ni) that are supplied from PE array 110. In addition, information collection unit 120 supplies an update request for updating the condition flag of each PE to be inactive to each PE of PE array 110. Information collection unit 120 further supplies detection result (det) that indicates that the condition flag of at least one of the PEs is active, selected data (do) that are the data of a PE that is selected from among each of the PEs, and the active number. The active number that is supplied from information collection unit 120 is the sum value of the active numbers (ni) that were received. In addition, in FIG. 6, the active number that is supplied from information collection unit 120 is represented as "no." In addition, information collection unit 120 is hierarchized and is provided with end-level information collection unit layer 120-1, intermediate information collection unit layer 120-2, and higher-level information collection unit 120-3. Although intermediate information collection unit layer 120-2 is one level in the present exemplary embodiment, intermediate information collection unit layer 120-2 may be further divided into a plurality of levels. Conversely, intermediate information collection unit layer 120-2 need not be provided.

End-level information collection unit layer 120-1 is a level that is directly connected to PE array 110, and is provided with end-level information collection units 120-1-1-120-1-n. In addition, end-level information collection unit layer 120-1 receives the condition flag (fi), data (di) and active number (ni) of each PE that are supplied from PE array 110. Then, based on the condition flags (fi), data (di), and active numbers (ni) that are received, supplies detection result (det), selected data (do), and active number (no) to intermediate information collection unit layer 120-2. In addition, end-level information collection unit layer 120-1 receives the update request (fo) that is supplied from intermediate information collection unit layer 120-2 as selection information. Then, based on the selection result that was received, end-level information collection unit layer 120-1 supplies update requests (fo) to PE array 110. In FIG. 6, the selection information received by end-level information collection unit layer 120-1 is represented as "sel." This selection information will be described later.

Intermediate information collection unit layer 120-2 is a level that is connected to end-level information collection unit layer 120-1 and is provided with intermediate information collection units 120-2-1-120-2-n. Intermediate information collection unit layer 120-2 receives each of detection results (det), selected data (do), and active number (no) that are supplied from end-level information collection unit layer 120-1 as condition flags (fi), data (di), and active numbers (ni), respectively. Intermediate information collection unit layer 120-2 then, based on the condition flags (fi), data (di), and active numbers (ni) that are received, supplies detection results (det), selected data (do), and active number (no) to higher-level information collection unit 120-3. In addition, intermediate information collection unit layer 120-2 receives the update requests (fo) that are supplied from higher-level information collection unit 120-3 as selection information (sel). Intermediate information collection unit layer 120-2 then, based on the selection information (sel) that was received, supplies an update request (fo) to end-level information collection unit 120-1.

Higher-level information collection unit 120-3 is connected to intermediate information collection unit layer 120-2 and receives each of the detection result (det), selected data (do), and active number (no) that are supplied from intermediate information collection unit layer 120-2 as condition flags (fi), data (di), and active numbers (ni), respectively. Higher-level information collection unit 120-3 then, based on the condition flags (fi), data (di) and active numbers (ni) that were received, supplies detection result (det), selected data (do), and active number (no). The selected data (do) that is supplied from higher-level information collection unit 120-3 is the collection result data that are the output in response to an SIMD data collection command. In addition, higher-level information collection unit 120-3 receives the execution request of an SIMD data collection command as selection information (sel), and supplies update requests (fo) to intermediate information collection unit layer 120-2 based on the selection information (sel) that was received.

Other than the input and output signals and the bit width of the internal signal lines, end-level information collection units 120-1-1-120-1-n, intermediate information collection units 120-2-1-120-2-n, and higher-level information collection unit 120-3 are of the same configuration. When end-level information collection units 120-1-1-120-1-n, intermediate information collection units 120-2-1-120-2-n, and higher-level information collection unit 120-3 are referred to as a group, they will be referred to as "subordinate information collection units."

Figure 7:
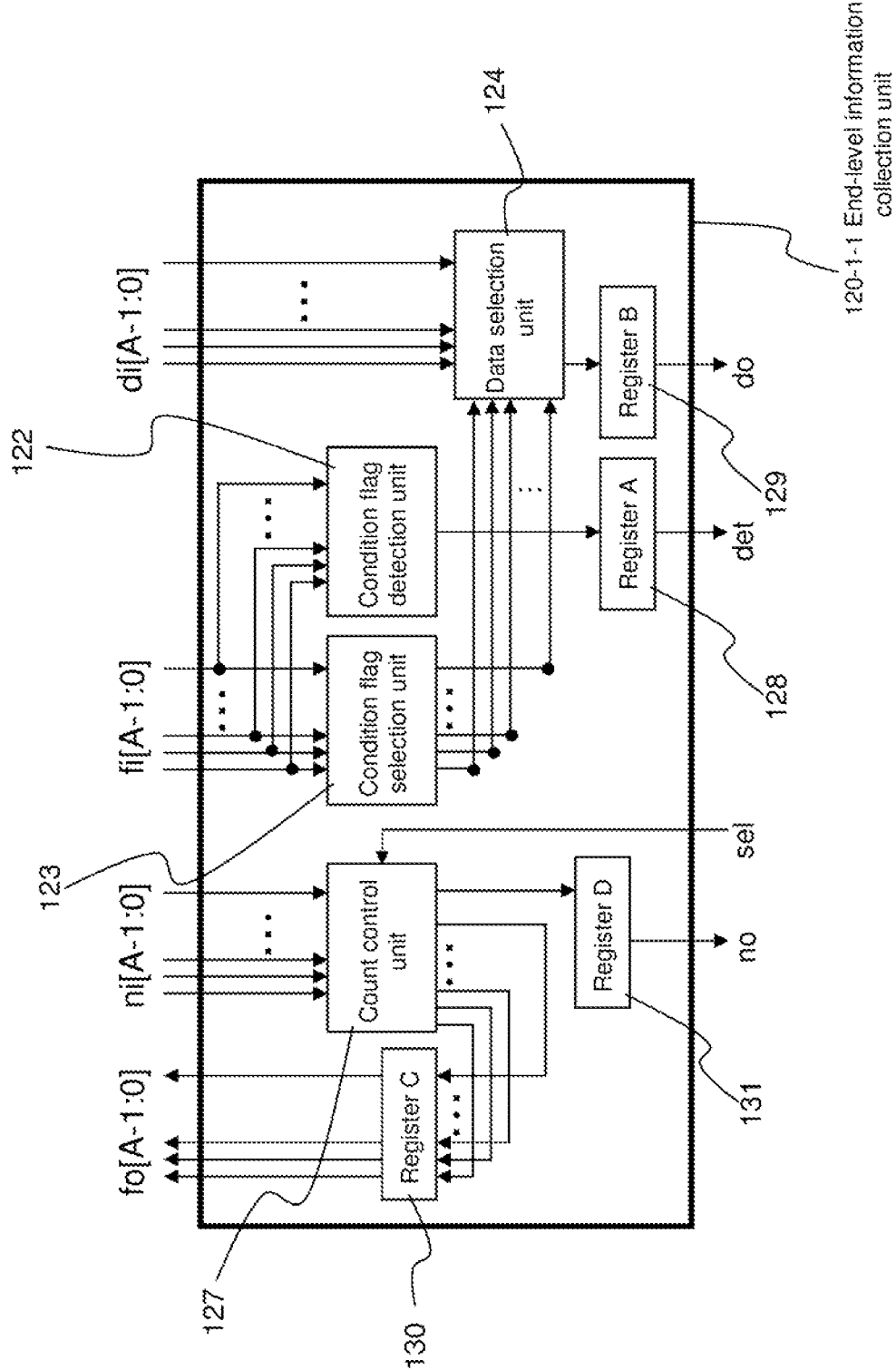
FIG. 7 is a block diagram showing an example of the configuration of the end-level information collection unit shown in FIG. 6.

FIG. 7 is a block diagram showing an example of the configuration of end-level information collection unit 120-1-1 that was shown in FIG. 6, and shows a case in which the number of PEs of the PE array 110 is A. A is a natural number equal to or greater than 2.

As shown in FIG. 7, end-level information collection unit 120-1-1 shown in FIG. 6 is provided with: condition flag detection unit 122, condition flag selection unit 123 that is a second condition flag selection unit, data selection unit 124 that is a second data selection unit, count control unit 127, register A 128, register B 129, register C 130, and register D 131.

Condition flag detection unit 122, condition flag selection unit 123, and data selection unit 124 are each of the same configuration as condition flag detection unit 22, condition flag selection unit 23, and data selection unit 24, respectively, that are shown in FIG. 2, and redundant explanation is therefore here omitted.

Count control unit 127 receives the condition flag (fi) that is supplied from PE array 110 as the active number (ni), and based on the active number (ni) that is received, manages the number of PEs for which the condition flags are active. Count control unit 127 then supplies the total value of the active numbers that were received to intermediate information collection unit layer 120-2 as active number (no). Count control unit 127 receives the selection information (sel) that is supplied from intermediate information collection unit layer 120-2, and based on the received selection information (sel), supplies update requests (fo) to PE array 110.

As shown in FIG. 7, the output from count control unit 127 and data selection unit 124 is temporarily stored in registers (register A 128, register B 129, register C 130, and register D 131) and then supplied to PE array 110 or to a subordinate information collection unit of a higher-order layer or a lower-order layer, whereby the processing of these outputs can be prevented from becoming a critical path.

FIG. 8 is a block diagram showing an example of the configuration of count control unit 127 shown in FIG. 7.

As shown in FIG. 8, count control unit 127 shown in FIG. 7 is provided with: selectors 127-1 and 127-2, register 127-3, logical adder 127-4, decrementor 127-5, logical NOT unit 127-6, logical multiplier 127-7, and adder 127-8.

Count control unit 127 is provided with a number A of each of the above-described components other than adder 127-8.

Selector 127-1 receives active number (ni) that is supplied from PE array 110 and output from decrementor 127-5. Selector 127-1 then selects either one of the received outputs and supplies the selection result to register 127-3. The selection of either output by selector 127-1 is controlled by the level of hierarchy in which count control unit 127 is present in counting from PE array 110 and by an SIMD data collection command. For example, assuming that the level that is directly connected to PE array 110 is the $0^{th}$ level, a case is considered in which count control unit 127 is present in the Lth level (where 0≤L). In this case, selector 127-1 selects the active number (ni) that is supplied from PE array 110 at the Lth clock from the execution of an SIMD data collection command, and otherwise selects the output from decrementor 127-5.

Register 127-3 selects and stores the output from selector 127-1 or any value that has already been stored. The storage of the output from selector 127-1 is of the two types shown in (1) and (2) below, and register 127-3 otherwise holds without alteration values that it has already stored.

(1) Cases of operation in a clock that matches in order the order of the hierarchy in which count control unit 127 is present, similar to selector 127-1.

(2) Cases in which the output from logical multiplier 127-7 that is connected by way of logical adder 127-4 is "1."

Decrementor 127-5 subtracts "1" from the value that was supplied from register 127-3 and supplies the value resulting from subtraction to selector 127-1.

Logical adder 127-4 calculates the logical sum of all bits of values supplied from register 127-3 and supplies the result to logical multiplier 127-7.

Selector 127-2 receives the output from logical multiplier 127-7 that is to its left in the figure and logical multiplier 127-7 that is to its right and selects one of the received outputs. However, because there is no logical multiplier 127-7 to the left in the case of selector 127-2 that is on the left end of the figure, 0 is received as input instead. Similarly, because there is no logical multiplier 127-7 to the right in the case of selector 127-2 that is on the right end of the figure, 0 is received as input instead. The selection by these selectors 127-2 is controlled by SIMD data collection commands. More specifically, when data are collected from PE on the left side of the figure to PE on the right side by means of an SIMD data collection command, i.e., when a higher order of priority is given to the PE on the left side of the figure, selector 127-2 selects output from logical multiplier 127-7 on the left side. On the other hand, when data are collected from PE on the right side of the figure to PE on the left side of the figure by means of an SIMD data collection command, selector 127-2 selects output from logical multiplier 127-7 on the right side.

Logical NOT unit 127-6 logically inverts the output from selector 127-2 and supplies the result to logical multiplier 127-7.

Logical multiplier 127-7 calculates the logical product of the output from logical adder 127-4, the selection information that was supplied from intermediate information collection unit layer 120-2, and the output from logical NOT unit 127-6, and then both supplies the logical product that was calculated to selector 127-2 and supplies the result as an update request (fo) to PE array 110. The calculated logical product is further used as an update signal of register 127-3.

Adder 127-8 calculates the sum of the active numbers from active numbers (ni) that were supplied from PE array 110, and supplies the calculation result as active number (no) to intermediate information collection unit layer 120-2.

In the following explanation, the operation of collecting data in the SIMD-array processor configured as described above is described. Here, a case is described in which information collection unit 120 is made up from the two levels of end-level information collection unit layer 120-1 and higher-level information collection unit 120-3.

FIG. 9 is a block diagram showing an example of the configuration of the SIMD-array processor shown in FIG. 6 and shows a case in which information collection unit 120 is made up from two levels.

In the SIMD-array processor shown in FIG. 9, PE array 110 has eight PEs (PE7-PE0), and the condition flags of each of these eight PEs are "11011011" in the order of PE7-PE0. End-level information collection unit layer 120-1 is provided with four end-level information collection units 120-1-1-120-1-4, and each of end-level information collection units 120-1-1-120-1-4 corresponds to two PE condition flags. For example, end-level information collection unit 120-1-1 receives "11" that is the condition flags of PE7 and PE6. In addition, it is assumed that PEs on the left side of the figure are given higher priority.

FIG. 10 is a view for describing the operation of collecting data in the SIMD-array processor shown in FIGS. 6-9.

FIG. 10 shows the values of condition flags at each clock and the values of each type of register of end-level information collection units 120-1-1-120-1-4 and higher-level information collection unit 120-3 at each clock. In the count control unit columns of the end-level information collection units and higher-level information collection unit in FIG. 10, the values relating to count control units 127 of end-level information collection units 120-1-1-120-1-4 and higher-level information collection unit 120-3 are represented in the format of "A/B . . . (C, DE . . . )."

For example, in the count control unit column of the end-level information collection units, the above-described A/B indicates the active numbers that are stored in registers 127-3 of count control units 127 of each of end-level information collection units 120-1-1-120-1-4. In addition, the above-described C indicate the total value of the active numbers that are stored in register D 131 (see FIG. 7) that is calculated by adders 127-8 of each of count control units 127. Still further, the above-described DE are the outputs of each of logical multipliers 127-7 in count control units 127 of each of end-level information collection units 120-1-1-120-1-4 and indicate update requests that have been stored in register C 130 (see FIG. 7).

In addition, the data selection unit columns of the end-level information collection units and higher-level information collection unit in FIG. 10 indicate the selected data that are stored in register B 129 (see FIG. 7).

The operations of collecting data in the SIMD-array processor shown in FIGS. 6 to 9 are next described for each clock.

Condition flags (fi) and active numbers (ni) of two PEs are first supplied from PE array 110 in the $0^{th}$ clock. Each of end-level information collection units 120-1-1-120-1-4 that receive the active numbers (ni) that are supplied from PE array 110 store the active numbers (ni) that were received in register 127-3 of count control unit 127. In this case, "1/1, 0/1, 1/0, 1/1) are stored in the order of end-level information collection units 120-1-1-120-1-4. In addition, because the active numbers in end-level information collection units 120-1-1-120-1-4 are each condition flags of one bit, the bit width of each register 127-3 is also one bit.

Adders 127-8 of each of count control units 127 of end-level information collection units 120-1-1-120-1-4 calculate the total value of active numbers (ni) that are received and store the results in register D 131. For example, in the case of end-level information collection unit 120-1-1, the active number (ni) that is received is "1/1," whereby the sum value of the active number is "2." In the case of end-level information collection unit 120-1-2, the active numbers (ni) that are received are "0/1," and the sum value of active numbers is therefore "1." The sum values are therefore "2, 1, 1, 2" in the order of end-level information collection units 120-1-1-120-1-4. These sum values are obtained by adding two one-bit active numbers, and the bit width of register D 131 is therefore two bits.

The outputs of each of logical multipliers 127-7 of each of count control units 127 of end-level information collection units 120-1-1-120-1-4 are stored in registers C 130. The selection information (sel) from higher-level information collection unit 120-3 in the $0^{th}$ clock is "0," and the outputs from each of logical multipliers 127-7 are therefore "00, 00, 00, 00" in all of end-level information collection units 120-1-1-120-1-4.

The result of execution of the above-described $0^{th}$ clock is shown in the count control unit column of the end-level information collection unit of the $0^{th}$ clock row in FIG. 10. In addition, the input to higher-level information collection unit 120-3 does not change in the $0^{th}$ clock. As a result, higher-level information collection unit 120-3 does not operate and the execution results are all "0." This is indicated in the count control unit column of the higher-level information collection unit in the $0^{th}$ clock row.

Next, in the first clock, the sum values of the active numbers that are stored in each of registers D 131 of each of end-level information collection units 120-1-1-120-1-4 are supplied to higher-level information collection unit 120-3.

Higher-level information collection unit 120-3 that has received the sum values of the active numbers that are supplied from end-level information collection units 120-1-1-120-1-4 as active number (ni) stores the active numbers (ni) that were received in each of registers 127-3 in count control units 127. In this case, "2/1/1/2" are stored in each of registers 127-3. In higher-level information collection unit 120-3, the active numbers are each of two bits, and the bit width of registers 127-3 is also two bits.

In addition, adder 127-8 of count control unit 127 of higher-level information collection unit 120-3 calculates the sum value of active numbers (ni) that are received and stores the result in register D 131. In this case, the active numbers (ni) that are received are "2/1/1/2" and the sum value of active numbers is therefore "6." This sum value is obtained by adding four active numbers of two bits and the bit width of register D 131 is therefore four bits.

The output of each of logical multipliers 127-7 of count control unit 127 of higher-level information collection unit 120-3 is stored in register C 130. In the first clock, "0" is to received as selection information (sel) by the SIMD array information collection command, and the output of each of logical multipliers 127-7 is therefore "0" ("0000").

The result of execution of the above-described first clock is shown in the count control unit column of the higher-level information collection unit in the first clock row in FIG. 10. No change occurs in the input to end-level information collection units 120-1-1-120-1-4 in the first clock. As a result, end-level information collection units 120-1-1-120-1-4 do not operate and the result of execution similarly remains unchanged from the $0^{th}$ clock. This is shown in the column of the count control unit of the end-level information collection unit and in the row of the first clock.

Next, in the second clock, the active numbers "2/1/1/2" are stored in each of registers 127-3 in count control unit 127 of higher-level information collection unit 120-3. In addition, "1" is applied as selection information (sel) by means of an SIMD array information collection command, whereby combining the outputs of each of logical multipliers 127-7 results in "1000." Because higher priority is given to PEs on the left side of the figure in this case, selector 127-2 selects the output from logical multiplier 127-7 to its left.

The outputs of each of logical multipliers 127-7 are stored in registers C 130. In addition, the outputs of each of logical multipliers 127-7 that are stored in registers C 130 are the selection information that is supplied to end-level information collection units 120-1-1-120-1-4.

The values that are stored in each of registers 127-3 are updated by values obtained by subtraction in each of decrementors 127-5. In this case, the results of updating are "1/1/1/2," and only the value of the left end is subtracted. This is because only the value stored in register 127-3 in which the output of logical multiplier 127-7 is "1" is updated.

The result of execution of the above-described second clock is shown in the column of the count control unit of the higher-level information collection unit and the row of the second clock in FIG. 10. The input to end-level information collection units 120-1-1-120-1-4 does not change in the second clock. As a result, end-level information collection units 120-1-1-120-1-4 do not operate and the result of execution therefore remains unchanged, similar to the first clock.

Next, in the third clock, higher-level information collection unit 120-3 supplies the outputs "1000" of each of logical multipliers 127-7 that are stored in registers C 130 as update requests (fo) to count control units 127 of each of end-level information collection units 120-1-1-120-1-4.

Count control units 127 of each of end-level information collection units 120-1-1-120-1-4 receive the update requests (fo) supplied from higher-level information collection unit 120-3 as selection information (sel). Here, in the case of end-level information collection unit 120-1-1, the selection information (sel) that is received is "1." In the case of end-level information collection units 120-1-2-120-1-4, the selection information (sel) that is received is "0," whereby only count control unit 127 of end-level information collection unit 120-1-1 for which the received selection information (sel) is "1" operates.

In count control unit 127 of end-level information collection unit 120-1-1, the received selection information (sel) is "1," and moreover, "1/1" are stored in each of registers 127-3, whereby the combination of the outputs of each of logical multipliers 127-7 results in. "10." Because higher priority is given to PEs on the left side of the figure in this case, selector 127-2 selects the value that is supplied from logical multiplier 127-1 to the left.

The outputs "10" of each of logical multipliers 127-7 are stored in registers C 130. The outputs of each of logical multipliers 127-7 that are stored in registers C 130 are then supplied to PE array 110 as update requests (fo) to the two PEs (PE7 and PE6) that are connected to end-level information collection unit 120-1-1.

The value stored in register 127-3 is updated by a value obtained by subtraction in decrementor 127-5. In this case, the results of updating are "0/1" and only the value of the left side is subtracted. This is because only the value that is stored in register 127-3 in which the output of logical multiplier 127-7 is "1" is updated.

The results of execution of end-level information collection units 120-1-1-120-1-4 in the third clock described hereinabove are shown in the column of the count control unit of end-level information collection unit and the third clock row in FIG. 10.

In addition, "1/1/1/2" are stored in each of registers 127-3 in count control unit 127 of higher-level information collection unit 120-3. The selection information is set to "1" by an SIMD array information collection command, whereby combining the outputs of each of logical multipliers 127-7 results in "1000."

The output of logical multiplier 127-7 is stored in register C 130. In addition, the value that is stored in register C 130 is the selection information that is supplied to end-level information collection units 120-1-1-120-1-4.

The values that are stored in each of registers 127-3 are updated by the value obtained by subtraction in decrementors 127-5.

The results of execution of higher-level information collection unit 120-3 in the third clock described hereinabove are shown in the column of the count control unit of the higher-level information collection unit and the row of the third clock in FIG. 10.

Next, the condition flags of PEs are updated according to update requests (fo) that are received in PE array 110 that has received update requests (fo) that are supplied from end-level information collection unit 120-1-1 at the fourth clock. Here, the update request (fo) that is received is "10," whereby the condition flag of PE7 that corresponds to "1" of "10" is updated to be inactive. This result is shown in the condition flag column and the fourth clock row in FIG. 10.

Higher-level information collection unit 120-3 further supplies the output "1000" of each of logical multipliers 127-7 that are stored in registers C 130 as the update requests (fo) to each of count control units 127 of end-level information collection units 120-1-1-120-1-4.

Count control units 127 of each of end-level information collection units 120-1-1-120-1-4 receive the update requests (fo) supplied from higher-level information collection unit 120-3 as selection information (sel). In this case, only count control unit 127 of end-level information collection unit 120-1-1 for which the received selection information (sel) is "1" operates.

In count control unit 127 of end-level information collection unit 120-1-1, the received selection information (sel) is "1," and moreover, "0/1" are stored in each of registers 127-3, whereby combining the outputs of each of logical multipliers 127-7 results in "01." The outputs "01" of each of logical multipliers 127-7 are stored in registers C 130. The outputs of each of logical multipliers 127-7 that are stored in registers C 130 are then supplied to PE array 110 as update requests (fo) to the two PEs (PE7 and PE6) that are connected to end-level information collection unit 120-1-1.

The value stored in register 127-3 is updated by a value obtained by subtraction in decrementor 127-5. In this case, the result of updating is "0/0."

The results of execution of end-level information collection units 120-1-1-120-1-4 at the fourth clock described above are shown in the column of the count control unit of the end-level information collection unit and the row of the fourth clock in FIG. 10.

Condition flag selection units 123 of each of end-level information collection units 120-1-1-120-1-4 receive condition flags (fi) that are supplied from PE array 110. In this case, "11, 01, 10, 11" are received in the order of end-level information collection units 120-1-1-120-1-4.

Each of condition flag selection units 123 of end-level information collection units 120-1-1-120-1-4 selects the bit that is further to the left side among the bits that are active in the received condition flags and then supplies the selection results to data selection unit 124. In this case, the selection results are "10, 01, 10, 10" in the order of end-level information collection units 120-1-1-120-1-4.

Data selection unit 124 that receives the selection results that are supplied from condition flag selection units 123 and the data (di) of each of the PEs that have been supplied from PE array 110 selects the data of the PEs according to the received selection results. In this case, the data of "PE7, PE4, PE3, PE1" are selected in the order of end-level information collection units 120-1-1-120-1-4. Data selection unit 124 then both stores the data of the PEs that were selected in register B 129 and supplies the selected data as selected data (do) to higher-level information collection unit 120-3. The values that are stored in register B 129 are shown in the column of the data selection unit of the end-level information collection unit and the row of the fourth clock in FIG. 10.

Each of condition flag detection units 122 of end-level information collection units 120-1-1-120-1-4 detects at least one bit that is active in the received condition flags and stores the detection results in register A 128. The detection result that is stored in register A 128 is supplied as detection result (det) to higher-level information collection unit 120-3.

The active numbers "0/1/1/2" are stored in each of registers 127-3 in count control unit 127 of higher-level information collection unit 120-3. In addition, the selection information is set to "1" by means of an SIMD array information collection command, whereby combining the outputs of each of logical multipliers 127-7 results in "0100."

The outputs of logical multipliers 127-7 are stored in register C 130, and the values stored in register C 130 are used as selection information (sel) that is supplied to end-level information collection units 120-1-1-120-1-4.

The values that are stored in each of registers 127-3 are updated by values obtained by subtraction in each of decrementors 127-5. In this case, the results of updating are "0/0/1/2."

The results of the execution of the operation of higher-level information collection unit 120-3 in the fourth clock described above are shown in the column of the count control unit of the higher-level information collection unit and the row of the fourth clock in FIG. 10.

Next, in the fifth clock, in PE array 110 that has received the update requests (fo) supplied from end-level information collection unit 120-1-1, the condition flags of PEs are updated based on the received update requests (fo). In this case, the received update request (fo) is "01," and the condition flag of PE6 that corresponds to "1" in "01" is therefore updated to be inactive. This result is shown in the column of condition flags and the row of the fifth clock in FIG. 10.

In addition, higher-level information collection unit 120-3 supplies the output "0100" of each of logical multipliers 127-7 that were stored in registers C 130 as update requests (fo) to count control units 127 of each of end-level information collection units 120-1-1-120-1-4.

The count control units 127 of each of end-level information collection units 120-1-1-120-1-4 receive the update requests (fo) supplied from higher-level information collection unit 120-3 as selection information (sel). In this case, only count control unit 127 of end-level information collection unit 120-1-2 for which the received selection information (sel) is "1" operates.

In count control unit 127 of end-level information collection unit 120-1-2, the 1, received selection information (sel) is "1," and moreover, "0/1" are stored in each register 127-3, and as a result, combining the outputs of each logical multiplier 127-7 results in "01." The output "01" of each logical multiplier 127-7 is stored in register C 130. The values stored in register C 130 is then supplied to PE array 110 as update request (fo) to the two PEs (PE5 and PE4) that are connected to end-level information collection unit 120-1-2.

In addition, the value that is stored in register 127-3 is updated by the value subjected to subtraction in decrementor 127-5. In this case, the results of updating are "0/0."

The results of execution of end-level information collection units 120-1-1-120-1-4 in the fifth clock described above are shown in the column of the count control unit of end-level information collection units and the row of the fifth clock in FIG. 10.

In addition, each of condition flag selection units 123 of end-level information collection units 120-1-1-120-1-4 receives condition flags (f) that are supplied from PE array 110. In this case, "01, 01, 10, 11" are received in the order of end-level information collection units 120-1-1-120-1-4.

Condition flag selection units 123 of each of end-level information collection units 120-1-1-120-1-4 select the bits that are on the leftmost side of the bits that are active in received condition flags (fi), and then supply these selection results to data selection unit 124. In this case, the selection results are "01, 01, 10, 10" in the order of end-level information collection units 120-1-1-120-1-4.

Data selection unit 124 that has received the selection results that were supplied from condition flag selection units 123 and data (di) of each of PEs that were supplied from PE array 110, selects the data of PEs according to the selection results that were received. In this case, the data of "PE6, PE4, PE3, PE1" are selected in the order of end-level information collection units 120-1-1-120-1-4. Data selection unit 124 then stores the data of the selected PEs in register B 129 and supplies the data as selected data (do) to higher-level information collection unit 120-3. The value that is stored in register B 129 is shown in the column of data selection units of end-level information collection units and the row of the fifth clock in FIG. 10.

In addition, condition flag detection units 122 of each of end-level information collection units 120-1-1-120-1-4 detect at least one bit that is active in the condition flags that are received and store the detection result in registers A 128. The detection results that are stored in registers A 128 are supplied to higher-level information collection unit 120-3 as detection results (det).

In addition, active numbers "0/0/1/2" are stored in each of registers 127-3 in count control unit 127 of higher-level information collection unit 120-3. The selection information (sel) is set to "1" by means of an SIMD array information collection command. In this way, combining the outputs of each of logical multipliers 127-7 results in "0010."

The outputs of logical multipliers 127-7 are stored in registers C 130. In addition, the outputs of logical multipliers 127-7 that have been stored in registers C 130 become the selection information that is supplied to end-level information collection units 120-1-1-120-1-4.

In addition, the values that are stored in each of registers 127-3 are updated by values obtained by subtraction in decrementor 127-5. In this case, the updated results are "0/0/0/2."

The results of execution of the operation of higher-level information collection unit 120-3 at the fifth clock described above are shown in the column of the count control unit of the higher-level information collection unit and the row of the fifth clock in FIG. 10.

Condition flag selection unit 123 of higher-level information collection unit 120-3 receives the detection results (det) supplied from end-level information collection units 120-1-1-120-1-4 as condition flags (fi). In this case, "1111" is received as the condition flags (fi). Condition flag selection unit 123 then selects the bit that is furthest to the left of the bits that are active in the condition flags (fi) that were received. In this case, the selection result is "1000." Condition flag selection unit 123 then supplies this selection result to data selection unit 124.

Data selection unit 124 that has received the selection results supplied from condition flag selection unit 123 and the data supplied from end-level information collection units 120-1-1-120-1-4 selects the data of PEs according to the selection results that were received. In this case, the data of PE7 are selected. Data selection unit 124 then both stores the data of the PE that was selected in register B 129 and supplies the data as selected data (do). These selected data (do) are the collection result data. The values stored in register B 129 are shown in the column of the data selection unit of the higher-level information collection unit and the row of the fifth clock in FIG. 10.

Condition flag detection unit 122 of higher-level information collection unit 120-3 detects at least one active bit in condition flags (fi) that are received as input and both stores the detected result in register A 128 and supplies the detected result as detection result (det).

By performing the same processing for the sixth to tenth clocks, SIMD array information collection commands that require delay in execution can be continuously issued.

In the present exemplary embodiment, the number of PEs is eight. As a result, a high proportion of the total number of clock cycles is occupied by the number of clock cycles until higher-level information collection unit 120-3 has supplied the collection result data. However, the number of PEs is actually as many as 128, and the proportion of the total number of clock cycles that is taken up by clock cycles until higher-level information collection unit 120-3 supplies the collection result data is therefore extremely small.

To generalize the explanation in the present exemplary embodiment, the subordinate information collection units of all levels are of configurations that are provided with registers B 129 and registers C 130. However, registers B 129 and registers C 130 need not necessarily be provided in the subordinate information collection units of all levels. This is because registers B 129 and registers C 130 are provided to divide the critical path. More specifically, the possibility exists that the paths in which end-level information collection units 120-1-1-120-1-*n* generate update requests according to selection information (sel) that is supplied from higher-level information collection unit 120-3 will become critical paths.

As a result, when the subordinate information collection units of each level are adjacent, and moreover, do not extend over three or more subordinate information collection units, registers B 129 and registers C 130 need not always be provided. In the present exemplary embodiment, end-level information collection units 120-1-1-120-1-*n* are provided with registers C 130, but because end-level information collection units 120-1-1-120-1-*n* and PE array 110 that is connected to them are normally arranged adjacent to each other, end-level information collection units 120-1-1-120-1-*n* need not be provided with registers C. For the same reason, end-level information collection units 120-1 need not be provided with registers B.

In higher-level information collection unit 120-3 as well, received selection information (sel) is not supplied from a higher-order subordinate information collection unit but is supplied directly by an SIMD array information collection command. The potential for the occurrence of a critical path is therefore reduced and registers C 130 need not be provided. In the present exemplary embodiment, higher-level information collection unit 120-3 is provided with register C 130, and the delay until collection result data are obtained from higher-level information collection unit 120-3 is therefore actually smaller and higher-level information collection unit 120-3 can obtain the initial collection result data in the second clock.

FIG. 11 is a block diagram showing an example of the configuration for a case in which registers B 129 and registers C 130 are eliminated from end-level information collection units 120-1-1-120-1-$n$ and register C 130 is eliminated from higher-level information collection unit 120-3 in the SIMD-array processor shown in FIGS. 6 to 9.

Thus, in the present exemplary embodiment, each of the PEs of PE array 110 supplies data (di) and a condition flag (fi) to information collection unit 120, and upon receiving an update request (fo) for updating the condition flags to be inactive, each of the PEs updates the condition flag to be inactive according to the received update request (fo). In addition, information collection unit 120, upon receiving data (di) and condition flags (ti) that are supplied from each of the PEs of PE array 110, selects one PE based on a predetermined order of priority from among the PEs for which the received condition flags (fi) are active and both supplies the data that are supplied from the selected PE as collection result data and supplies an update request (fo) for updating the condition flag of the processing element that was selected to be inactive.

As a result, the operating speed is not limited by a critical path.

In addition, SIMD data collection commands can be issued continuously regardless of the number of delay clock cycles that are required for updating condition flags and data that satisfy a predetermined condition can be collected efficiently.

When collecting data from a multiplicity of PEs, the use of hierarchized subordinate information collection units enables the facilitation of wiring and the distribution of processing load.

Third Exemplary Embodiment

Figure 12:
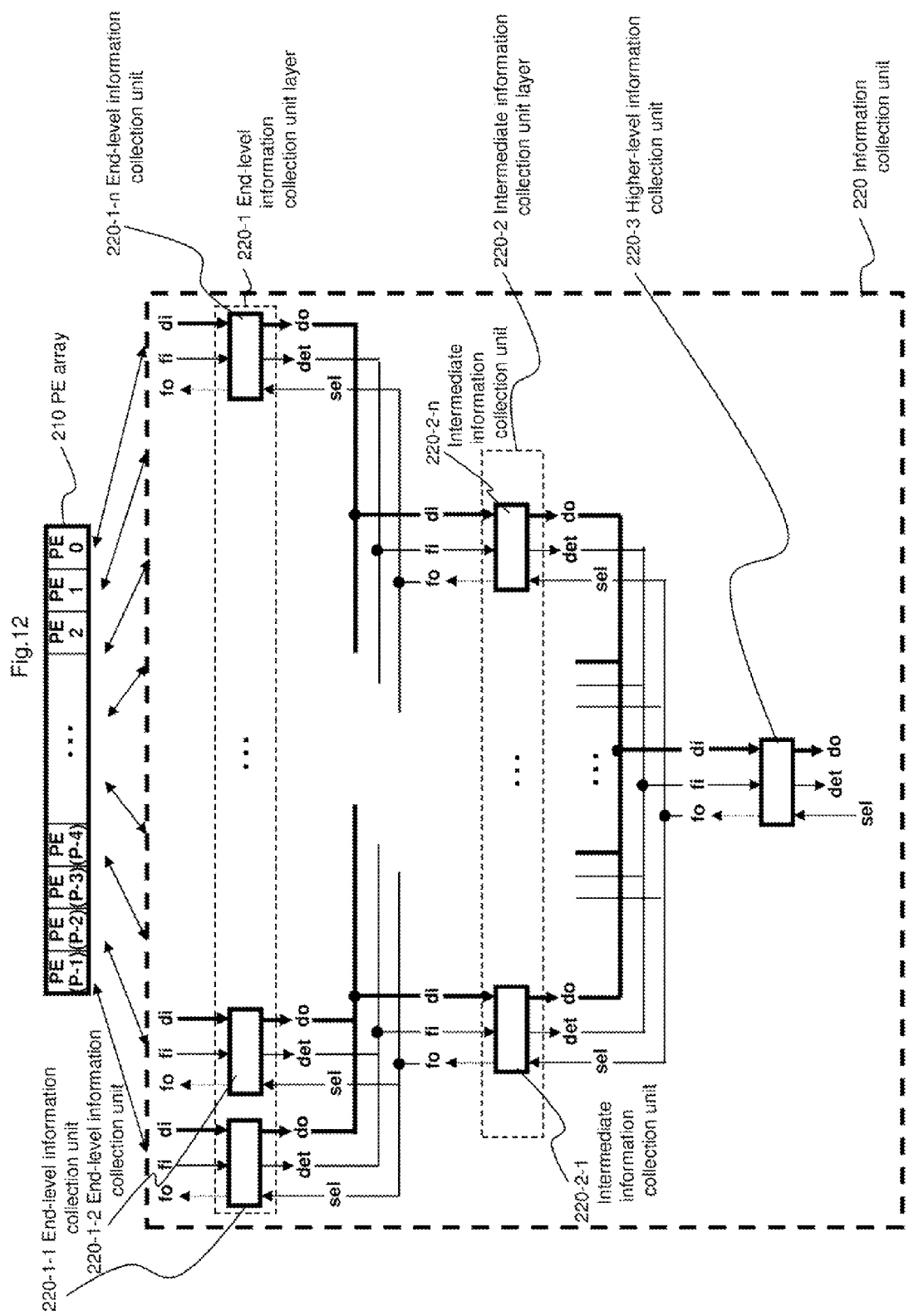
FIG. 12 is a block diagram showing the configuration of the third exemplary embodiment of the SIMD-array processor in which the processor of the present invention is applied.

FIG. 12 is a block diagram showing the configuration of the third exemplary embodiment of the SIMD-array processor in which the processor of the present invention is applied.

As shown in FIG. 12, the SIMD-array processor of the present exemplary embodiment is provided with PE array 210 that is made up from P PEs, and information collection unit 220 that collects data from PEs having data that satisfy a predetermined condition among the PEs of PE array 210. P is a natural number equal to or greater than 2.

PE array 210 supplies condition flags (fi) and data (di) of each PE to information collection unit 220.

Information collection unit 220 receives the condition flags (fi) of each PE and the data (di) of each PE that are supplied from PE array 210. In addition, information collection unit 220 further supplies to each PE of PE array 210 an update request (fo) for updating the condition flag of each PE to be inactive. In addition, information collection unit 220 supplies a detection result (det) that indicates that the condition flag of at least one PE is active and selected data (do) that are the data of the PE that was selected from among each of the PEs. Information collection unit 220 is further hierarchized and is provided with end-level information collection unit layer 220-1, intermediate information collection unit layer 220-2, and higher-level information collection unit 220-3. In the present exemplary embodiment, intermediate information collection unit layer 220-2 is one level, but intermediate information collection unit layer 220-2 may be further divided into a plurality of levels. Conversely, intermediate information collection unit layer 220-2 may be left out.

End-level information collection unit layer 220-1 is a level that is directly connected to PE array 210, and is provided with end-level information collection units 220-1-1-220-1-$n$. In addition, end-level information collection unit layer 220-1 receives the condition flag (fi) and data (di) of each PE that are supplied from PE array 210. Then, based on the received condition flags (fi) and data (di), end-level information collection unit layer 220-1 supplies detection results (det) and selected data (do) to intermediate information collection unit layer 220-2. In addition, end-level information collection unit layer 220-1 receives update requests (fo) that are supplied from intermediate information collection unit layer 220-2 as selection information (sel). End-level information collection unit layer 220-1 then, based on the received selection information (sel), supplies update requests (fo) to PE array 210.

Intermediate information collection unit layer 220-2 is a level that is connected to end-level information collection unit layer 220-1 and provided with intermediate information collection units 220-2-1-220-2-$n$. Intermediate information collection unit layer 220-2 receives each of detection results (det) and selected data (do) that are supplied from end-level information collection unit layer 220-1 as condition flags (fi) and data (di), respectively. Intermediate information collection unit layer 220-2 then, based on the condition flags (fi) and data (di) that were received, supplies detection results (det) and selected data (do) to higher-level information collection unit 220-3. Intermediate information collection unit layer 220-2 further receives update requests (fo) supplied from higher-level information collection unit 220-3 as selection information (sel). Intermediate information collection unit layer 220-2 then, based on the selection information (sel) that were received, supplies update requests (fo) to end-level information collection unit 220-1.

Higher-level information collection unit 220-3 is connected to intermediate information collection unit layer 220-2 and receives each of detection results (det) and selected data (do) that are supplied from intermediate information collection unit layer 220-2 as condition flags (fi) and data (di), respectively. Higher-level information collection unit 220-3 then, based on the condition flags (fi) and data (di) that were received, supplies detection results (det) and selected data (do). The selected data (do) that are supplied from higher-level information collection unit 220-3 are the collection result data that are the output in response to an SIMD data collection command. In addition, higher-level information collection unit 220-3 receives the execution request of an SIMD data collection command as selection information (sel) and, based on the selection information (sel) that is received, supplies update requests (fo) to intermediate information collection unit layer 220-2.

End-level information collection units 220-1-1-220-1-$n$, intermediate information collection units 220-2-1-220-2-$n$, and higher-level information collection unit 220-3 are of the same construction other than the signals that are received as input or supplied as output and the bit width of the signal lines. When referring to end-level information collection units 220-1-1-220-1-$n$, intermediate information collection units 220-2-1-220-2-$n$, and higher-level information collection unit 220-3, as a group in the following explanation, the term "subordinate information collection units" is used.

Figure 13:
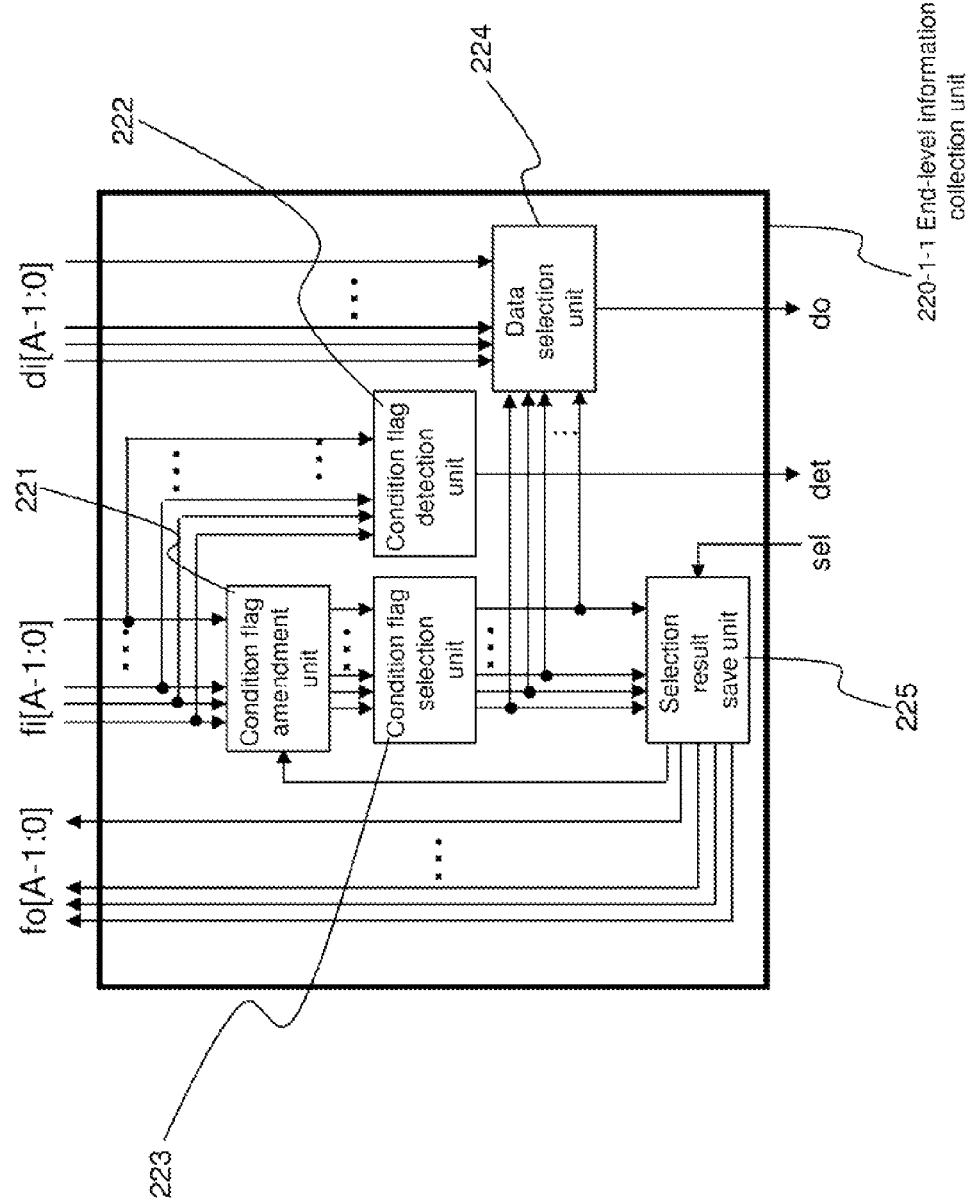
FIG. 13 is a block diagram showing an example of the configuration of the end-level information collection unit shown in FIG. 12.

FIG. 13 is a block diagram showing an example of the configuration of end-level information collection unit 220-1-1 shown in FIG. 12 and shows a case in which the number of PEs of PE array 210 is A. A is a natural number equal to or greater than 2.

As shown in FIG. 13, end-level information collection unit 220-1-1 shown in FIG. 12 is provided with condition flag amendment unit 221 that is the second condition flag amendment unit, condition flag detection unit 222, condition flag selection unit 223 that is the third condition flag selection unit, data selection unit 224 that is the third data selection unit, and selection result save unit 225 that is the second selection result save unit.

The configurations of each of condition flag amendment unit 221, condition flag selection unit 223, and data selection unit 224 are the same as the configurations of condition flag amendment unit 21, condition flag selection unit 23, and data selection unit 24, respectively, shown in FIG. 2, and redundant explanation is therefore here omitted.

Condition flag detection unit 222 receives the condition flag (fi) of each PE that is supplied from PE array 210 and then detects that at least one bit or at least two bits of condition flags (fi) that were received are active. Condition flag detection unit 222 then supplies a first detection result indicating that at least one bit is active and a second detection result indicating that at least two bits are active. In FIG. 13, the first detection result and the second detection result that are supplied from condition flag detection unit 222 are represented as "det."

Selection result save unit 225 is provided with one register (not shown). Selection result save unit 225 receives the selection result that is supplied from condition flag selection unit 223 and stores the selection result that was received in the register. In addition, selection result save unit 225 is provided with an AND circuit (not shown) that calculates the logical product of values that are stored in the register and selection information that is supplied from intermediate information collection unit layer 220-2 and supplies the result of this logical multiplication to condition flag amendment unit 221 as condition flag amendment information. Selection result save unit 225 further supplies update requests to PE array 210.

In the present exemplary embodiment, the configurations of the subordinate information collection units differ somewhat for each level. For example, condition flag detection units 222 of end-level information collection units 220-1-1-220-1-$n$ or intermediate information collection units 220-2-1-220-2-$n$, instead of receiving amended condition flags that are supplied from condition flag amendment unit 221, receive condition flags that are supplied from PE array 210 or end-level information collection unit layer 220-1. On the other hand, condition flag detection unit 222 of higher-level information collection unit 220-3 receives the amended condition flags supplied from condition flag amendment unit 221. In addition, the selection of the data of PEs by data selection unit 224 in end-level information collection units 220-1-1-220-1-$n$ or intermediate information collection units 220-2-1-220-2-$n$ is carried out based on the output from condition flag selection unit 223. In contrast, the selection of the data of PEs by data selection unit 224 in higher-level information collection unit 220-3 is carried out based on the output of selection result save unit 225.

The operation of collecting data in the SIMD-array processor that is configured as described above is next described. A case is here described in which information collection unit 220 is made up from the two levels of end-level information collection unit layer 220-1 and higher-level information collection unit 220-3.

FIG. 14 is a block diagram showing an example of the configuration of the SIMD-array processor shown in FIG. 12, and shows a case in which information collection unit 220 is made up from two levels.

In the SIMD-array processor shown in FIG. 14, PE array 210 has eight PEs (PE7-PE0), and the condition flags of these eight PEs are "11011011" in the order of PE7-PE0. In addition, end-level information collection unit layer 220-1 is provided with four end-level information collection units 220-1-1-220-1-4, each of end-level information collection units 220-1-1-220-1-4 corresponding to the condition flags of two PEs. For example, end-level information collection unit 220-1-1 receives "11" that are the condition flags of PE7 and PE6.

To prevent the generation of a long path between end-level information collection unit layer 220-1 and higher-level information collection unit layer 220-3 that would result in a critical path, end-level information collection units 220-1-1-220-1-4 are provided with registers A 228 that store data that are selected by data selection units 224.

FIG. 15 is a view for describing the operation of collecting data in the SIMD-array processor shown in FIGS. 12 to 14. It is here assumed that the number of delay clock cycles is one clock cycle and that PEs on the left side of the figure are given higher priority.

FIG. 15 shows the values of condition flags in each clock and various register values of end-level information collection units 220-1-1-220-1-4 and higher-level information collection unit 220-3 in each clock.

The end-level information collection unit column is first described. The condition flag (amended) column shows the condition flags of each PE that is connected to end-level information collection units 220-1-1-220-1-4 and amended condition flags that have been amended by condition flag amendment units 221 of end-level information collection units 220-1-1-220-1-4.

The condition flag selection unit (selection result save unit) column shows the selection results realized by condition flag selection units 223 of end-level information collection units 220-1-1-220-1-4 and the values of the registers of selection result save units 225 that store these selection results.

The data selection unit (register A) column shows the PEs that have data that have been selected by the data selection units 224 of end-level information collection units 220-1-1-220-1-4 and the values of registers A 228 that store these PEs.

The higher-level information collection unit column is next described. The condition flag amendment unit column shows the amended condition flags that have been amended by condition flag amendment unit 221 of higher-level information collection unit 220-3.

The condition flag selection unit (selection result save unit) column shows the selection results of condition flag selection unit 223 of higher-level information collection unit 220-3 and the value of the register of selection result save unit 225 that has stored this selection result.

The data selection unit column shows the PEs that have data that have been selected by data selection unit 224 of higher-level information collection unit 220-3.

The operation of collecting data for each clock in the SIMD-array processor shown in FIGS. 12 to 14 is next described.

First, the $0^{th}$ clock is the initial cycle of executing an SIMD array information collection command. As a result, each of condition flag amendment units 221 of end-level information collection units 220-1-1-220-1-4 that have received the condition flag (fi) of each PE that is supplied from PE array 210 supply the received condition flags (fi) as amended condition flags to condition flag detection units 222 and condition flag selection units 223. More specifically, "11, 01, 10, 11" are supplied in the order of end-level information collection units 220-1-1-220-1-4.

Condition flag selection units 223 of each of end-level information collection units 220-1-1-220-1-4 receive the amended condition flags that were supplied from condition flag amendment units 221 and then select the "1" that is furthest to the left among the bits that are active in the received amended condition flags. Condition flag selection units 223 then supply the selection results to data selection units 224 and selection result save units 225. In the case of, for example, end-level information collection unit 220-1-1, the amended condition flags that were received are "11," and selection result of selecting the "1" that is furthest to the left is therefore "10." In the case of end-level information collection unit 220-1-2, the amended condition flags that were received are "01," and the selection result of selecting the "1" that is furthest to the left is therefore "01." Combining these selection results for end-level information collection units 220-1-1-220-1-4 results in "10011010" as shown in the column of condition flag selection units of end-level information collection units and the row of the 0$^{th}$ clock in FIG. 15.

Data selection units 224 of each of end-level information collection units 220-1-1-220-1-4 that have received the selection results that are supplied from condition flag selection units 223 and the data of each PE that were supplied from PE array 210 select the data of PEs according to the received selection results and then supply the selected data of the PEs to higher-level information collection unit 220-3 as selected data (do). In the case of, for example, end-level information collection unit 220-1-2, the selection result of condition flag selection unit 223 is "10," and the data of PE7 therefore becomes selected data. In the case of end-level information collection unit 220-1-1, the selection result of condition flag selection unit 223 is "01," and the data of PE4 therefore becomes selected data. Combining these for end-level information collection units 220-1-1-220-1-4 results in "PE7, PE4, PE3, PE1" as shown in the column of the data selection units of end-level information collection units and the row of the 0$^{th}$ clock in FIG. 15. The data of these PEs are stored as selected data in registers A 228 at the ending clock edge of the 0$^{th}$ clock.

Selection result save units 225 that have received the selection results that were supplied from condition flag selection units 223 save the selection results that were received in registers in selection result save units 225 at the ending clock edge of the 0$^{th}$ clock.

In addition, condition flag detection units 222 of each of end-level information collection units 220-1-1-220-1-4 supply first detection results and second detection results (det) to condition flag amendment unit 221 of higher-level information collection unit 220-3. In the case of, for example, end-level information collection unit 220-1-1, the condition flags that are received from PE array 210 are "11," both being "1." Accordingly, the first detection result and the second detection result are both "1." In the case of end-level information collection unit 220-1-2, the condition flags received from PE array 210 are "01," with at least one being "1."Accordingly, the first detection result is "1," but the second detection result is "0." Combining the first detection result and second detection result of end-level information collection units 220-1-1-220-1-4 therefore results in a first detection result of "1111" and a second detection result of "1001."

This explanation pertains to the initial cycle of executing an SIMD array information collection command. As a result, condition flag amendment unit 221 of higher-level information collection unit 220-3 supplies "1111" that is the first detection result as amended condition flags. This is shown in the column of the condition flag amendment unit of the higher-level information collection unit and the row of the 0$^{th}$ clock in FIG. 15.

Condition flag selection unit 223 of higher-level information collection unit 220-3 receives the amended condition flags supplied from condition flag amendment unit 221 and selects the "1" that is furthest to the left among the bits that are active in the amended condition flags that were received. "1000" that are the selection results are then stored in the register in selection result save unit 225 at the ending clock edge of the 0$^{th}$ clock.

Selection result save unit 225 of higher-level information collection unit 220-3 in the first clock supplies the selection result "1000" that was stored in the register in selection result save unit 225 to each of selection result save units 225 of end-level information collection units 220-1-1-220-1-4 as update requests (fo).

Each of selection result save units 225 of end-level information collection units 220-1-1-220-1-4 receive the update requests (fo) that were supplied from selection result save unit 225 of higher-level information collection unit 220-3 as selection information (sel). In the case of, for example, end-level information collection unit 220-1-1, the received selection information (sel) is "1." In the cases of end-level information collection units 220-1-2-220-1-4, the received selection information (sel) is "0."

Accordingly, selection result save unit 225 of end-level information collection unit 220-1-1 calculates the logical product of the received selection information (sel) and the selection result "10" of the preceding cycle that was stored in the register in selection result save unit 225. In this case, the calculated logical product is "10." Selection result save unit 225 of end-level information collection unit 220-1-1 supplies this calculated logical product as condition flag amendment information to condition flag amendment unit 221.

Condition flag amendment unit 221 that has received the condition flag amendment information that was supplied from selection result save unit 225 makes "01," which is the exclusive OR of the condition flag amendment information "10" that was received and the condition flags "11" of the PEs that were received from PE array 210, the amended condition flag. On the other hand, condition flag amendment units 221 of the other end-level information collection units 220-1-2-220-1-4 supply the condition flags that were received from PE array 210 without alteration. In this way, combining the amended condition flags that are supplied by each of condition flag amendment units 221 of end-level information collection units 220-1-1-220-1-4 results in "01011011." This is shown in the column of condition flags (amended) of end-level information collection units and the row of the first clock in FIG. 15.

Condition flag selection units 223 of each of end-level information collection units 220-1-1-220-1-4 receive the amended condition flags that were supplied from condition flag amendment units 221 and then select the "1" that is furthest to the left among the bits that are active in the amended condition flags that were received. Condition flag selection units 223 then supply the selection results to data selection units 224 and selection result save units 225. In the case of end-level information collection unit 220-1-1, for example, the amended condition flags that were received are "01," and the selection result of selecting the "1" that is furthest to the left is therefore "01." Similarly, in the case of end-level information collection unit 220-1-2, the amended condition flags that were received are "01," and the result of selecting "1" that is furthest to the left is therefore "01."

Combining these selection results for end-level information collection units 220-1-1-220-1-4 results in "01011010" as shown in the column of condition flag selection units of end-level information collection units and the row of the first clock in FIG. 15.

Data selection units 224 of each of end-level information collection units 220-1-1-220-1-4 that have received the selection results that are supplied from condition flag selection units 223 and the data of each PE that are supplied from PE array 210 select the data of PEs according to the selection results that were received. Data selection units 224 then supply the selected data of the PEs as selected data (do) to higher-level information collection unit 220-3. In the case of, for example, end-level information collection unit 220-1-1, the selection result of condition flag selection unit 223 is "01," and the data of PE6 therefore become selected data. In the case of end-level information collection unit 220-1-2, the selection result of condition flag selection unit 223 is "01," and the data of PE4 therefore become selected data. Combining these results for end-level information collection units 220-1-1-220-1-4 results in "PE6, PE4, PE3, PE1" as shown in the column of data selection units of end-level information collection units and the row of the first clock in FIG. 15. The data of these PEs are recorded as selected data in registers A 228 at the ending clock edge of the first clock.

Selection result save units 225 that have received the selection results supplied from condition flag selection units 223 store the selection results that were received in registers in selection result save units 225 at the ending clock edge of the first clock.

Condition flag detection units 222 of each of end-level information collection units 220-1-1-220-1-4 supply first detection results and second detection results (det) to condition flag amendment unit 221 of higher-level information collection unit 220-3. In the case of, for example, end-level information collection unit 220-1-1, the condition flags received from PE array 210 are "11" in which both flags are "1." Accordingly, the first detection result and the second detection result are both "1." In the case of end-level information collection unit 220-1-2, the condition flags received from PE array 210 are "01" in which at least one condition flag is "1." Accordingly, the first detection result is "1," but the second detection result is "0." Combining the first detection results and the second detection results of end-level information collection units 220-1-1-220-1-4 in this way results in first detection results of "1111" and second detection results of "1001."

The object of explanation here are the cycles in which SIMD array information collection commands are continuously executed. As a result, condition flag amendment unit 221 of higher-level information collection unit 220-3 calculates the logical product in bit units of the register value "1000" that is stored in selection result save unit 225 and the second detection result "1001" that was received. Condition flag amendment unit 221 further calculates the logical product in bit units of the logical inverted result "0111" of bit units of the register value and the first detection result "1111" that was received. The logical sum in bit units of the two logical products that were calculated is then supplied as the amended condition flags. In this case, the logical sum of "1000" and "0111" is calculated and "1111" are supplied as the amended condition flags as shown in the column of the condition flag amendment unit of the higher-level information collection unit and the row of the first clock in FIG. 15.

Condition flag selection unit 223 of higher-level information collection unit 220-3 receives the amended condition flags that are supplied from condition flag amendment unit 221. Condition flag selection unit 223 selects "1" that is furthest to the left among the bits that are active in the amended condition flags that were received and then stores the selection results "1000" in the register in selection result save unit 225 at the ending clock edge of the first clock. In this case, the selection results that were stored in the $0^{th}$ clock are updated to the selection results in the first clock.

Data selection unit 224 of higher-level information collection unit 220-3 obtains the selection results that has not been updated and that were stored in the register of selection result save unit 225. Data selection unit 224 then selects data that are supplied from end-level information collection units 220-1-1-220-1-4 that correspond to bits that are active in these selection results that were acquired. In this case, end-level information collection unit 220-1-1 corresponds to the bit that is active in the selection results "1000" that were stored in the register of selection result save unit 225 before updating. As a result, the data of PE7 that were supplied from end-level information collection unit 220-1-1 are selected. The data of PE7 are supplied as the collection result data.

Selection result save unit 225 of higher-level information collection unit 220-3 supplies the selection results "1000" that were stored in the register before updating as update requests (fo) to selection result save units 225 of end-level information collection units 220-1-1-220-1-4 at the ending clock edge of the first clock.

Selection result save units 225 of each of end-level information collection units 220-1-1-220-1-4 receive the update requests (fo) that were supplied from selection result save unit 225 of higher-level information collection unit 220-3 as selection information (sel). In the case of, for example, end-level information collection unit 220-1-1, the selection information (sel) that is received is "1." In the case of end-level information collection unit 220-1-1, the selection information (sel) that is received is "0."

Accordingly, selection result save unit 225 of end-level information collection unit 220-1-1 calculates the logical product of the received selection information (sel) and the selection results "10" of the preceding cycle that were stored in the register in selection result save unit 225. In this case, the calculated logical product is "10." Selection result save unit 225 of end-level information collection unit 220-1-1 supplies this logical product that was calculated to condition flag amendment unit 221 as the condition flag amendment information. In addition, selection result save unit 225 of end-level information collection unit 220-1-1 supplies the selection result "10" of the preceding cycle that was stored in the register in selection result save unit 225 as update request (fo) to PE array 210.

In PE array 210 that has received the update request (fo) that was supplied from end-level information collection unit 220-1-1, the condition flag of PE7 that corresponds to "1" of the update request (fo) "10" that was received is updated to be inactive. As a result, the condition flag becomes "01011011" as shown in the condition flag column and the row of the second clock in FIG. 15.

Next, the second clock is the cycle of continuously executing an SIMD array information collection command similar to the first clock. Selection result save unit 225 of higher-level information collection unit 220-3 supplies the selection results "1000" that were stored in the register in selection result save unit 225 to each of selection result save units 225 of end-level information collection units 220-1-1-220-1-4 as update requests (fo).

Selection result save units 225 of each of end-level information collection units 220-1-1-220-1-4 receive the update requests (fo) supplied from selection result save unit 225 of higher-level information collection unit 220-3 as selection information (sel). In the case of, for example, end-level information collection unit 220-1-1, the selection information (sel) is "1." In the case of end-level information collection units 220-1-2-220-1-4, the received selection information (sel) is "0."

Accordingly, selection result save unit 225 of end-level information collection unit 220-1-1 calculates the logical product of selection information (sel) that was received and selection result "01" of the preceding cycle that was stored in the register in selection result save unit 225. In this case, the logical product that is calculated is "01." Selection result save unit 225 of end-level information collection unit 220-1-1 supplies this logical product that was calculated to condition flag amendment unit 221 as condition flag amendment information.

Condition flag amendment unit 221 that has received the condition flag amendment information that was supplied from selection result save unit 225 takes as the amended condition flags "00," which is the exclusive OR of the condition flag amendment information "01" that was received and condition flags "01" of the PE that were received from PE array 210. On the other hand, condition flag amendment units 221 of the other end-level information collection units 220-1-2-220-1-4 supply the condition flags that were received from PE array 210 without alteration. Combining the amended condition flags that are supplied by each of condition flag amendment units 221 of end-level information collection units 220-1-1-220-1-4 in this way results in "00011011." This is shown in the column of condition flags (amended) of end-level information collection units in the row of the second clock in FIG. 15.

Condition flag selection units 223 of each of end-level information collection units 220-1-1-220-1-4 receive the amended condition flags that were supplied from condition flag amendment units 221 and then select the "1" that is furthest to the left among the bits that are active in the amended condition flags that were received. Condition flag selection units 223 then supply the selection results to data selection units 224 and selection result save units 225. In the case of, for example, end-level information collection unit 220-1-1, the amended condition flags that were received are "00," and the selection result of selecting the "1" that is furthest to the left is "00." Similarly, in the case of end-level information collection unit 220-1-2, the received amended condition flags are "01," and the result of selecting the "1" that is furthest to the left is "01." Combining these selection results for end-level information collection units 220-1-1-220-1-4 results in "00011010" as shown in the column of the condition flag selection units of the end-level information collection units and the row of the second clock in FIG. 15.

Data selection units 224 of each of end-level information collection units 220-1-1-220-1-4 that have received the selection results that were supplied from condition flag selection units 223 and the data of each PE that was supplied from PE array 210 select the data of PEs according to the selection results that were received and then supply the data of the PEs that were selected to higher-level information collection unit 220-3 as selected data (do). In the case of, for example, end-level information collection unit 220-1-2, the selection result of condition flag selection unit 223 is "01," and the data of PE4 therefore become the selected data. Combining these for all of end-level information collection units 220-1-1-220-1-4 results in "PE6, PE4, PE3, PE1" as shown in the column of data selection units of end-level information collection units and the row of the second clock in FIG. 15. The data of these PEs are stored as selected data in registers A 228 at the ending clock edge of the second clock. In the case of end-level information collection unit 220-1-1, the selection result realized by condition flag selection unit 223 is "00." Accordingly, data selection unit 224 does not select new data, but rather, holds without alteration the data of PE6 that are already stored in register A 228.

Selection result save unit 225 that has received the selection result that was supplied from condition flag selection unit 223 stores the received selection result in the register in selection result save unit 225 at the ending clock edge of the second clock.

Condition flag detection units 222 of each of end-level information collection units 220-1-1-220-1-4 supply the first detection results and the second detection results (det) to condition flag amendment unit 221 of higher-level information collection unit 220-3. In the case of, for example, end-level information collection units 220-1-1 and 220-1-2, the received condition flags are "01," at least one being "1." Accordingly, the first detection result is "1," but the second detection result is "0." Combining the first detection result and second detection result of end-level information collection units 220-1-1-220-1-4 thus results in a first detection results of "1111" and a second detection results of "0001."

The object of explanation here are the cycles in which SIMD array information collection commands are continuously executed. As a result, condition flag amendment unit 221 of higher-level information collection unit 220-3 calculates the logical product in bit units of the register value "1000" that is stored in selection result save unit 225 and the second detection result "0001" that was received. Condition flag amendment unit 221 further calculates the logical product in bit units of logical inverted result "0111" of the bit units of the register value and the first detection result "1111" that was received. The logical sum of the bit units of the two calculated logical products is then calculated and "0111" is supplied as the amended condition flags as shown in the column of the condition flag amendment unit of the higher-level information collection unit and the row of the second clock in FIG. 15.

Condition flag selection unit 223 of higher-level information collection unit 220-3 receives the amended condition flags that were supplied from condition flag amendment unit 221 and selects "1" that is furthest to the left of the bits that are active in the amended condition flag that was received. Condition flag selection unit 223 then stores "0100" that is the selection result in the register of selection result save unit 225 at the ending clock edge of the second clock. In this case, the selection result that was stored in the first clock is updated to the selection result in the second clock.

Data selection unit 224 of higher-level information collection unit 220-3 further obtains the selection result that precedes updating that was stored in the register of selection result save unit 225 and selects data that are supplied from end-level information collection units 220-1-1-220-1-4 that correspond to bits that are active in the selection result that were acquired. In this case, The end-level information collection unit that corresponds to the bit that is active in the selection result "1000" that was stored in the register of selection result save unit 225 before updating is end-level information collection unit 220-1-1. As a result, the data of PE6 that were supplied from end-level information collection unit 220-1-1 are selected. The data of PE6 are then supplied as the collection result data.

Selection result save unit 225 of higher-level information collection unit 220-3 supplies the selection results "1000" that were stored in the register before updating to selection result save units 225 of end-level information collection units 220-1-1-220-1-4 as update requests (fo) at the ending clock edge of the second clock.

Each of selection result save units 225 of end-level information collection units 220-1-1-220-1-4 receive the update requests (fo) that were supplied from selection result save unit 225 of higher-level information collection unit 220-3 as selection information (sel). In the case of end-level information collection unit 220-1-1, for example, the selection information (sel) that is received is "1," and the selection information (sel) that is received in end-level information collection units 220-1-2-220-1-4 is "0."

Accordingly, selection result save unit 225 of end-level information collection units 220-1-1 calculates the logical product of the selection information (sel) that was received and the selection results (01) of the preceding cycle that were stored in registers of selection result save unit 225. The logical product that is calculated in this case is "01." Selection result save unit 225 of end-level information collection unit 220-1-1 supplies this logical product that was calculated to condition flag amendment unit 221 as condition flag amendment information. Selection result save unit 225 of end-level information collection unit 220-1-1 further supplies the selection result "01" of the preceding cycle that was stored in the register in selection result save unit 225 to PE array 210 as an update request (fo).

In PE array 210 that has received the update request (fo) that was supplied from end-level information collection unit 220-1-1, the condition flag of PE6 that corresponds to "1" of the received update request (fo) "01" is updated to be inactive. As a result, the condition flags become "00011011" as shown in the column of condition flags and the row of the third clock in FIG. 15.

SIMD array information collection commands can be continuously issued by means of the same processing in the third to seventh clocks.

In the present exemplary embodiment, the number of PEs is eight. As a result, the proportion of the total number of clock cycles taken up by the number of clock cycles until higher-level information collection unit 220-3 supplies the collection result data is high. However, because the number of PEs is actually as many as 128, the proportion of the total number of clock cycles that is taken up by the number of clock cycles until higher-level information collection unit 220-3 supplies collection result data is extremely small.

In the present exemplary embodiment that is configured as described above, each of the PEs of PE array 210 supplies data (di) and a condition flag (fi) to information collection unit 220, and upon receiving an update request (fo) for updating the condition flag to be inactive, updates the condition flags to be inactive according to the received update requests (fo). In addition, information collection unit 220, upon receiving data (di) and condition flags (fi) that were supplied from each of the PEs of PE array 210, selects one PE based on a predetermined order of priority from among the PEs in which the received condition flags (fi) are active and both supplies the data that are supplied from the selected PE as collection result data and supplies update request (fo) for updating the condition flag of the processing element that was selected to be inactive.

As a result, the operating speed is not limited by a critical path.

In addition, SIMD data collection commands can be continuously issued and data that satisfy a predetermined condition can be efficiently collected even when delay of one clock cycle is generated for updating condition flags.

In addition, when collecting data of a multiplicity of PEs, wiring can be facilitated and the processing load can be distributed by using hierarchized subordinate information collection units.

What is claimed is:

1. A processor, comprising:
a plurality of processing elements that operate in parallel based on operation commands and
an information collection unit that collects data of each of said plurality of processing elements, wherein:
each of said plurality of processing elements holds data and a respective condition flag that is set to be active or inactive depending on said data, supplies said data and said respective condition flag to said information collection unit upon receiving one of said operation commands, and then, upon receiving an update request to update said respective condition flag to be inactive, updates said respective condition flag to be inactive in accordance with the update request that was received; and
said information collection unit, upon receiving said data and said respective condition flags supplied from each of said plurality of processing elements, selects one processing element for which the respective condition flag that was received is active based on a predetermined order of priority from among processing elements for which the respective condition flags that were received are active, and supplies both the data of the selected processing element as collection result data and said update request for updating said respective condition flag of the selected processing element to be inactive.

2. The processor as set forth in claim 1, wherein:
said information collection unit comprises:
a first selection result save unit that stores a selection result that indicates said processing element that was selected and that generates and supplies condition flag amendment information for amending the respective condition flag associated with the selected processing element that was received according to the selection result that was stored;
a first condition flag amendment unit that receives said respective condition flags that are supplied from each of said plurality of processing elements, amends said respective condition flags that were received according to said condition flag amendment information that was supplied from said first selection result save unit, and supplies amended condition flags;
a first condition flag selection unit that receives said amended condition flags that were supplied from said first condition flag amendment unit, according to the amended condition flags that were received, selects based on said predetermined order of priority, one said processing element for which said amended condition flag is active, and supplies said selection result that indicates the processing element that was selected;
a first data selection unit that receives said data that was supplied from each of said plurality of processing elements and said selection result that was supplied from said first condition flag selection unit and supplies as said collection result data said data of the processing element that is indicated by said selection result that was received;
a condition flag updating unit that receives said selection result that was supplied from said first condition flag selection unit and supplies said update request for updating to be inactive said respective condition flag of the processing element that is indicated by said selection result that was received; and said first selection result save unit receives said selection result that was supplied from said first condition flag selection unit and stores said selection result that was received.

3. The processor as set forth in claim 2, wherein said first selection result save unit stores, in the order of reception, a number of said selection results that were received, depending on the number of delay clock cycles necessary for updating said respective condition flag and uses the logical sum of said selection results that were stored as said condition flag amendment information.

4. The processor as set forth in claim 2, wherein said first condition flag amendment unit calculates the exclusive OR of said respective condition flags that were received and said condition flag amendment information that was supplied from said first selection result save unit to find said amended condition flags.

5. The processor as set forth in claim 1, wherein:
said information collection unit comprises:
a count control unit that receives said respective condition flags that are supplied from each of said plurality of processing elements, determines a count of processing elements that have respective condition flags that are active among said plurality of processing elements according to said respective condition flags that were received, and stores the count;
a second condition flag selection unit that receives said respective condition flags that are supplied from each of said plurality of processing elements, selects, based on said predetermined order of priority, one of said processing elements, the respective condition flag of which is active according to said received respective condition flags, and supplies a selection result that indicates the processing element that was selected; and
a second data selection unit that receives said data that was supplied from each of said plurality of processing elements and said selection result that was supplied from said second condition flag selection unit and supplies as said collection result data said data of the processing element that is indicated by said selection result that was received; and
said count control unit, upon receiving said respective condition flags that are supplied from each of said plurality of processing elements, selects one said processing element for which said respective condition flag is active based on said predetermined order of priority according to said count; and both supplies said update request for updating to be inactive said respective condition flag of the processing element that was selected and decreases by 1 the count.

6. The processor as set forth in claim 1, wherein:
said information collection unit comprises:
a second selection result save unit that stores a selection result that indicates said processing element that was selected;
a second condition flag amendment unit that receives said respective condition flags that are supplied from each of said plurality of processing elements, amends said respective condition flags that were received according to the selection result that is stored in said second selection result save unit, and supplies the amended condition flags;
a third condition flag selection unit that receives said amended condition flags that were supplied from said second condition flag amendment unit, selects one said processing element for which said amended condition flag is active based on said predetermined order of priority according to amended condition flags that were received, and supplies said selection result that indicates the processing element that was selected; and
a third data selection unit that receives said data supplied from each of said plurality of processing elements and said selection result supplied from said third condition flag selection unit and supplies as collection result data said data of said processing element indicated by said received selection result; and
said second selection result save unit receives said selection result that was supplied from said condition flag selection unit, and, after storing said received selection result, supplies said update request for updating said respective condition flag, of the processing element that is indicated by said selection result that was stored, to be inactive.

7. The processor as set forth in claim 6, wherein:
said information collection unit includes a condition flag detection unit that receives said respective condition flags that are supplied from said plurality of processing elements;
said condition flag detection unit detects a number of respective condition flags that are active among said respective condition flags that were received when the number of delay clock cycles required for updating said respective condition flags is one clock cycle; and
said second selection result save unit supplies the update request to one of the plurality of PEs having the condition flag that is active, according to a result that was detected in said condition flag detection unit.

8. A data collection method in a processor that includes a plurality of processing elements that operate in parallel based on operation commands and that hold data and respective condition flags that are set to be active or inactive according to said data and an information collection unit that collects data of each of said plurality of processing elements, said data collection method comprising:
a process of each of the plurality of said processing elements, upon receiving one of said operation commands, supplying said data and said respective condition flag to said information collection unit;
a process of said information collection unit receiving said data and said respective condition flags that are supplied from each of said plurality of processing elements;
a selection process of said information collection unit selecting one processing element for which the respective condition flag that was received is active based on a predetermined order of priority from among said processing elements for which said respective condition flags that were received are active;
a process of said information collection unit supplying data of said processing element that was selected as collection result data;
an update request output process of said information collection unit supplying an update request for updating to be inactive said respective condition flag of said processing element that was selected; and
a process of each of said processing elements, upon receiving said update request, updating said respective condition flag to be inactive in accordance with the update request that was received.

9. The data collection method as set forth in claim 8, further comprising:
- a storage process of said information collection unit storing selection results that indicate said processing element that was selected; wherein said selection process includes:
- an amendment information generation process of generating condition flag amendment information for amending said respective condition flags that are received according to a selection result that was stored;
- an amended condition flag generation process of generating amended condition flags in which said received respective condition flags are amended according to said condition flag amendment information; and
- a process of, based on said predetermined order of priority, selecting one said processing element for which the amended condition flag is active according to said amended condition flags that were generated.

10. The data collection method as set forth in claim 9, wherein:
- said storage process is a process of storing, in the order of reception, a number of said selection results that were received, the number stored thereof corresponding to the number of delay clock cycles that are required for updating said respective condition flag; and
- said amendment information generation process is a process of calculating the logical sum of said selection results that were stored, and generating the result as said condition flag amendment information.

11. The data collection method as set forth in claim 9, wherein said amended condition flag generation process is a process of calculating, as said amended condition flags, the exclusive OR of said condition flags that were received and said condition flag amendment information.

12. The data collection method as set forth in claim 8, further comprising:
- a process of said information collection unit calculating a count of processing elements having respective condition flags that are active among said plurality of processing elements according to said respective condition flags that are received and storing the count; and
- wherein said update request output process further includes a process of, upon output of said update request for updating to be inactive said respective condition flag of said processing element that was selected, decreasing by "1" said count, accounting for said processing element that was selected.

13. The data collection method as set forth in claim 8, further comprising:
- a process of said information collection unit storing a selection result that indicates said processing element that was selected;

wherein:
- said selection process includes:
- a process of generating amended condition flags in which said respective condition flags that were received are amended according to said selection result that was stored; and
- a process of, based on said predetermined order of priority, selecting one said processing element for which the amended condition flag is active according to said amended condition flags that were generated; and
- said update request output process further includes a process of, after storing said received selection result, supplying said update request for updating said respective condition flag, of said processing element that is indicated by said selection result that was stored, to be inactive.

14. The data collection method as set forth in claim 13, further comprising:
- a process of, when the number of delay clock cycles that are required for updating said respective condition flags is one clock cycle, said information collection unit detecting the number of respective condition flags that are active among said respective condition flags that were received;
- wherein said update request output process further includes a process of supplying said update request according to a detected result.

* * * * *